(12) United States Patent
Chatman et al.

(10) Patent No.: US 8,306,286 B1
(45) Date of Patent: *Nov. 6, 2012

(54) METHOD AND APPARATUS FOR DETERMINING FACIAL CHARACTERISTICS

(76) Inventors: Andrew S. Chatman, Pittsford, NY (US); Melissa Geska, Webster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,709

(22) Filed: Nov. 15, 2011

Related U.S. Application Data

(63) Continuation of application No. 11/778,642, filed on Jul. 16, 2007, now Pat. No. 8,077,931.

(60) Provisional application No. 60/831,060, filed on Jul. 14, 2006.

(51) Int. Cl.
*G06K 9/00* (2006.01)

(52) U.S. Cl. ............... 382/118; 382/154; 382/190

(58) Field of Classification Search ............ 382/118, 382/154, 190; 351/246; 705/26
See application file for complete search history.

(56) References Cited

U.S. PATENT DOCUMENTS

| | | | |
|---|---|---|---|
| 6,095,650 A * | 8/2000 | Gao et al. | 351/227 |
| 6,293,284 B1 | 9/2001 | Rigg | |
| 6,307,568 B1 * | 10/2001 | Rom | 345/629 |
| 6,937,755 B2 | 8/2005 | Orpaz et al. | |
| 6,944,327 B1 * | 9/2005 | Soatto | 382/154 |
| 7,010,146 B2 * | 3/2006 | Fukuma et al. | 382/118 |
| 7,027,622 B2 * | 4/2006 | Pengwu | 382/118 |
| 7,079,158 B2 | 7/2006 | Lambertsen | |
| 7,187,788 B2 | 3/2007 | Simon et al. | |
| 7,337,127 B1 | 2/2008 | Smith et al. | |
| 8,077,931 B1 * | 12/2011 | Chatman et al. | 382/118 |
| 2003/0063794 A1 * | 4/2003 | Rubinstenn et al. | 382/154 |
| 2005/0203724 A1 | 9/2005 | Orpaz et al. | |
| 2006/0062435 A1 | 3/2006 | Yonaha | |
| 2006/0197775 A1 | 9/2006 | Neal | |
| 2007/0130020 A1 | 6/2007 | Paolini | |
| 2007/0258656 A1 | 11/2007 | Aarabi | |
| 2011/0022965 A1 * | 1/2011 | Lawrence et al. | 715/747 |

FOREIGN PATENT DOCUMENTS

| | | |
|---|---|---|
| KR | 1020000036873 A | 7/2000 |
| KR | 1020010110850 A | 12/2001 |
| KR | 1020020006368 A | 1/2002 |
| KR | 1020050083197 A | 8/2005 |
| WO | WO 2008/057577 A2 | 5/2008 |

* cited by examiner

*Primary Examiner* — Gregory M Desire
(74) *Attorney, Agent, or Firm* — Moser Taboada

(57) ABSTRACT

A method, apparatus, and system for determining the characteristics of a face or body part is provided. The method may include obtaining an image that includes a rendering of a face or body part of a person; analyzing the image to obtain at least one characteristic of the rendering, forming, as a function of the at least one characteristic, a model of the rendering of the face or body part, and using the model to select at least one article.

20 Claims, 18 Drawing Sheets

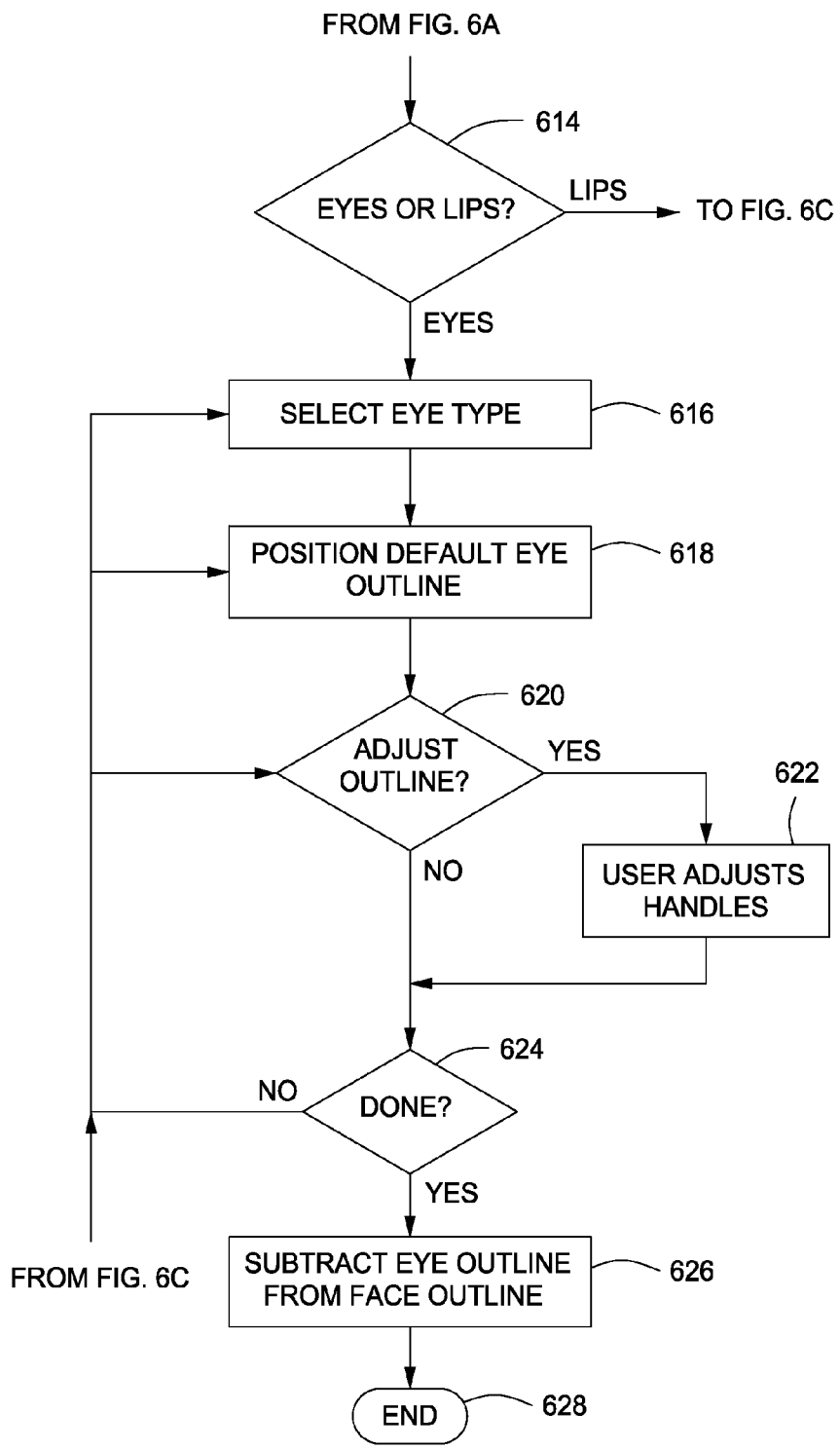

METHOD AND APPARATUS FOR DETERMINING FACIAL CHARACTERISTICS

CROSS-REFERENCE TO RELATED APPLICATIONS

This application is a continuation of U.S. patent application Ser. No. 11/778,642, filed Jul. 16, 2007, now U.S. Pat. No. 8,077,931 which claims the benefit of priority of U.S. Provisional Patent Application Ser. No. 60/831,060, filed Jul. 14, 2006, each of which are herein incorporated by reference in their entirety.

BACKGROUND

1. Field of Art

The following generally relates to methods, apparatuses and systems for image processing, and more particularly, to a method, apparatus and system for processing an image that includes a face of a person so as to determine facial characteristics of the face included within the image.

2. Description of the Related Art

People use makeup, jewelry, hair styles, hair color, eye glasses, and other accessories (collectively "beauty accessories") to enhance or augment their appearance. As is well known, these beauty accessories should be selected to augment the facial characteristics of a wearer such items. Unfortunately, the wearer (or other person assisting the wearer) often selects the makeup, jewelry, hair styles, hair color, eye glasses, and other accessories without any assistance of a properly-trained and/or educated expert. As such, the selection of the beauty accessories that are intended to enhance the appearance of the wearer may not do so because the wearer (or other person selecting the beauty accessories) lacks tools and/or education for optimally selecting such items based on the facial characteristics of the wearer.

Therefore, there is a need in the art for a method, apparatus and system for determining facial characteristics of the wearer so as to (i) allow selection of beauty accessories that optimize the appearance of the wearer, and/or (ii) educate and/or assist the wearer, a person assisting the wearer and/or an expert in selecting beauty accessories that optimize the appearance of the wearer.

SUMMARY

A method, apparatus, and system for determining the characteristics of a face or body part is provided. The method may include obtaining an image that includes a rendering of a face or body part of a person; analyzing the image to obtain at least one characteristic of the rendering, forming, as a function of the at least one characteristic, a model of the rendering of the face or body part, and using the model to select at least one article.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A, 6B, and 6C are a flow diagram illustrating an example of a process for performing a shape analysis of a rendering of a face in an image;

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

Architecture Example

Figure 1:
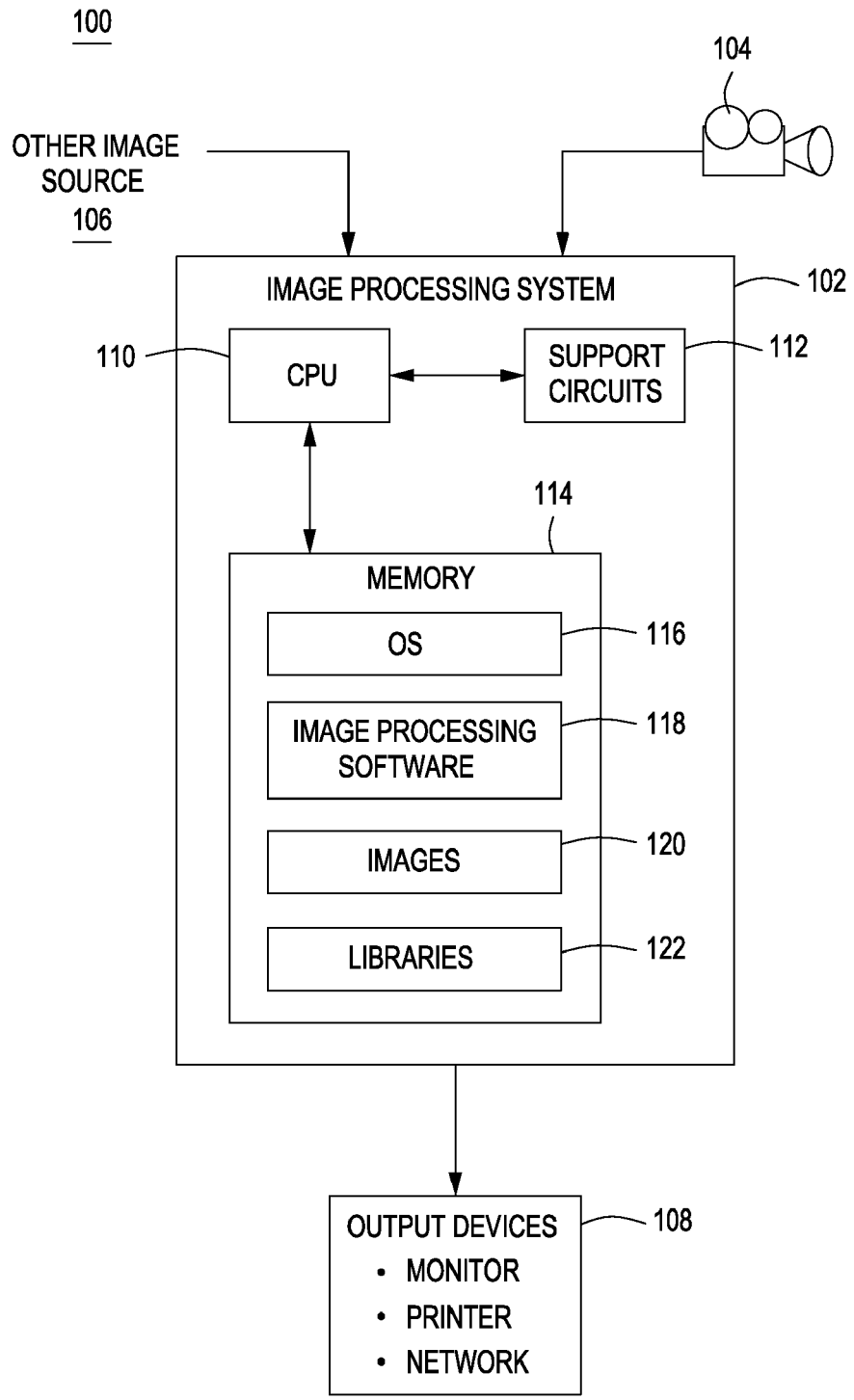
FIG. 1 is a block diagram illustrating an example of a computer system that is operable to execute program instructions for performing a process for determining facial characteristics of person.

FIG. 1 is a block diagram illustrating a system 100 that is operable to execute program instructions (e.g., software or other code) for performing a process for determining facial characteristics of person. The system 100 may be any computing device, system and the like, and may be formed in a single unitary device and concentrated on a single server, client, peer or other type node. Such device and/or node may be or be included in, for example, a kiosk that is readily accessible to the public.

Alternatively, the system 100 may be formed from one or more separate devices, and as such, may be distributed among a number of server, client, peer or other type nodes. In addition, the system 100 may be scalable (i.e., may employ scale-up and/or scale-out approaches).

The system 100 may include a large number of elements; many of which are not shown for simplicity of exposition. As shown in FIG. 1, the system 100 includes an image-processing system 102, a camera 104, and an output device 108.

The camera 104 is operable to capture within its field of view one or more images the face, head and/or other portion of the body of the person, and provide such image to the image-processing system 102. To facilitate this, the camera 104 may include a processor, memory and an image-capturing device, such as a charge-coupled device. The camera 104 may be a stand-alone device, such as a hand-held digital camera; or, alternatively, included within or an accessory coupled to any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like.

The image-processing system 102 is operable to obtain from the camera 104 the images (each a "native image"); or import, retrieve or otherwise obtain the images (each a "native image") from other image sources 106, such as, a CD-ROM, a memory of a device connectable via a network, a memory stick or card, and the like. The image-processing system 102 is also operable to render, modify and/or adjust one or more of the native images to form one or more processed images. After processing, the imaging-processing system 102 may output the native and/or the processed images to one or more of the output devices 108, which may be any of a monitor, a printer, a network, and the like. Alternatively, the image-processing system 102 may output the native and/or the processed images to the memory 114.

To facilitate the foregoing functions, the image-processing system 102 may be or be included within, for example, any of or any combination of a personal computer; a portable computer, a handheld computer; a mobile phone, a digital assistant, a personal digital assistant, a cellular phone, a smart phone, a pager, a digital tablet, a laptop computer, an Internet appliance and the like. In general, the image processing system 102 includes a processor-based platform that operates on any suitable operating system, such as Microsoft® Windows®, Apple OSX, Unix, Linux and/or Symbian; and that is capable of executing software.

The image-processing system 102 may, however, include a large number of elements; many of which are not shown in FIG. 1 for simplicity of exposition. As shown in FIG. 1, the image-processing system 102 may include a processing platform that is operable to control, manipulate or otherwise interact with the camera 104, the image sources 106, and/or the output device 108, via respective couplings. The processing platform may include one or more processing units (collectively "processor") 110, memory 114 and support circuits 112.

The processor 110 may be one or more conventional processors, microprocessors, multi-core processors and/or microcontrollers. The support circuits 112 comprise well-known circuits that are used to facilitate the operation of the processor 110. The support circuits 112 may include clock circuits, power supplies, cache, input/output circuits, network cards, and the like.

The memory 114 may comprise one or more of read only memory, random access memory, disc drives, optical memory, or any other form of storage used for digital signals and software. The memory 114 may store (and receive requests from the processor 110 to obtain) image-processing software 118, images 120, libraries 122 and various other stored software packages, such as operating system 116.

The memory 114 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like. In addition, the memory 114 may store (and receive requests from the processor 110 to obtain) operands, operators, dimensional values, configurations, and other data that are used by the operating system 116 and the image-processing software 118 to control the operation of and/or to facilitate performing the functions of the image-processing system 102.

Each of the libraries 122 may contain information for rendering on a display (not shown) one or more articles that may be applied to the rendering of the native and/or processed images. These articles may include, for example, makeup, hair colors, jewelry, and other accessories. In addition to being accessible via the image-processing system, the libraries may be accessed remotely by a user via a network using any of or any combination of wired and/or wireless connections.

These libraries 122 can be updated, edited, copied and the like. In addition, additional libraries may be added to the libraries 122 by importing, installing or otherwise obtaining and storing such libraries into the memory 114 or various external databases (not shown). The addition of such libraries to the libraries 122 may be performed, for example, by way of an installation program transferring the libraries to the memory 114 from a CD-ROM or other storage device. Alternatively and/or additionally, the additional libraries may be added by way of manual input by a user. The libraries 122 may be self-contained in their own data files, or extracted on the fly from various other types of databases, including e-commerce and inventory sites.

Example Operation

Figure 2:
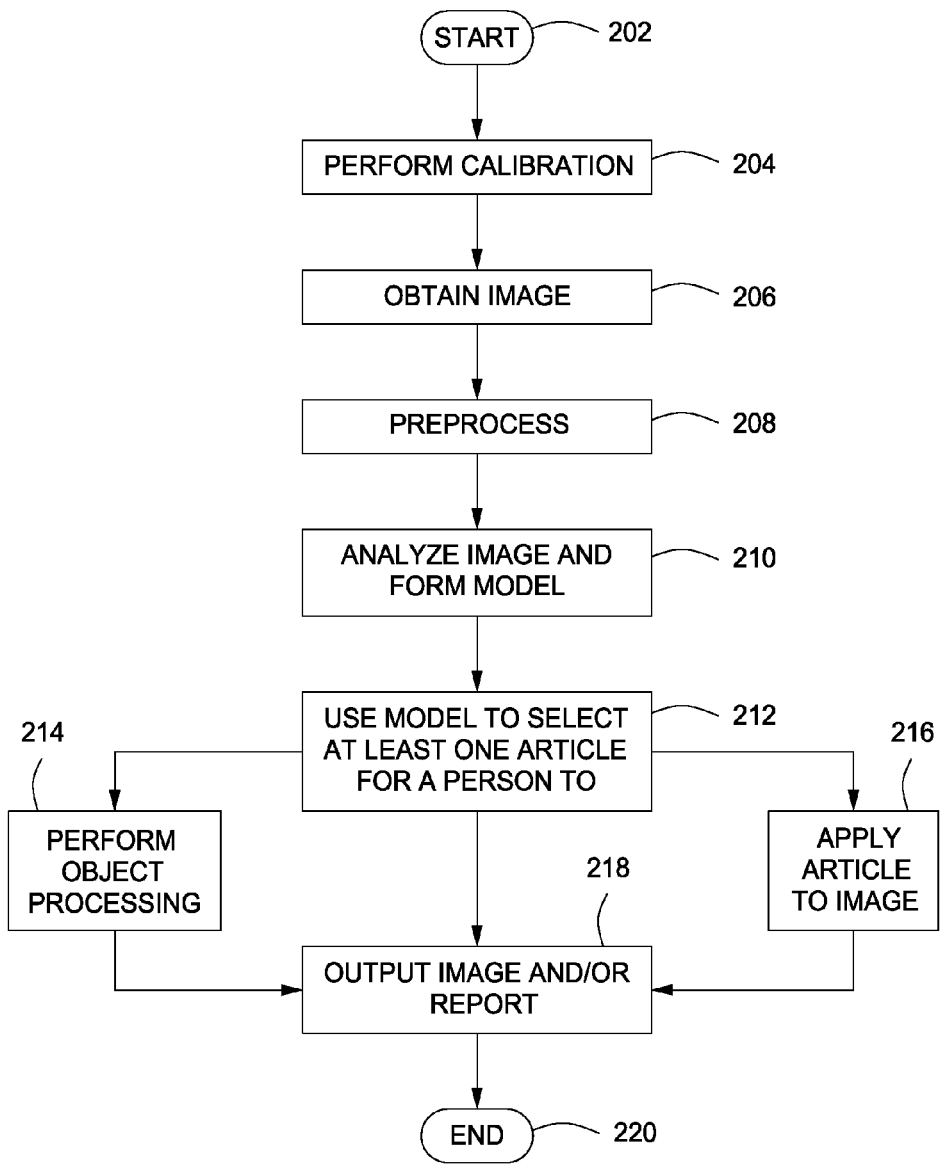
FIG. 2 is a flow diagram illustrating an example of a process for determining facial characteristics of a person.

FIG. 2 is a flow diagram illustrating an example of a process 200 for determining facial characteristics of a person. For convenience, the process 200 is described with reference to the system 100 of FIG. 1. The process 200, however, may be carried out using other architectures as well.

The process 200 begins at termination block 202, and proceeds to process block 204. At process block 204, the system 100 performs a calibration. The calibration may be accomplished by adjusting the camera 104 and/or the display (e.g., one or more monitors) so that attributes of items being captured by the camera 104 and rendered on the display ("virtual attributes") match, are consistent with or otherwise correspond to the physical attributes of the items. This may be carried out using a calibration routine.

The calibration routine may be, for example, a software routine ("software-calibration routine") that can be carried out by the image-processing system 102. The software-calibration routine may be carried out in any of an automatic mode and semiautomatic mode. In the automatic mode, the software-calibration routine can be carried out without significant interaction by the user.

In the semiautomatic mode, the software-calibration routine can be carried out using more input and/or guidance from the user than in the automatic mode. The software-calibration routine in the semiautomatic mode may, for example, guide the user through a number of menus that prompt the user for input to carry out the calibration.

As an alternative to the software routine, the calibration routine may be a manual routine ("manual-calibration routine"). The manual-calibration routine may be, for example, a set of instructions that the user follows or that guides the user through the calibration.

To facilitate carrying out the calibration, the calibration routine (software and/or manual) may use a calibration palette. This calibration palette may be standardized and/or specifically calibrated ("standard palette"). The standard palette in combination with appropriate instructions and/or code of the calibration routine may be operable to remove, minimize and/or reduce judgment by the user as to determination of the virtual attributes of the standard palette. Alternatively, the calibration routine may include instructions and/or code that allow, request and/or require the judgment of the user in determining the virtual attributes of the standard palette.

As an alternative to the standard palette, the calibration palette may be non-standardized and/or arbitrarily selected. Like the standard palette, the calibration routine may include instructions and/or code to (i) remove, minimize and/or reduce judgment by the user as to determination of the virtual attributes of such palette, or alternatively, (ii) allow, request and/or require the judgment of the user in determining the virtual attributes of such palette.

An example of the calibration palette (standard or otherwise) is a palette having color as its attribute ("color palette"). The color palette may have disposed thereon one or more samples of substances; each having a given color. Using the color palette, the calibration routine is operable to calibrate one or more colors of the system 100. For example, the software-calibration routine in the automatic mode may carry out such calibration as follows. After the user places the color palette and/or portions thereof within the field of view of the camera 104, the calibration routine may cause the camera 104 to capture images of the color palette and/or portions thereof and/or cause the display to render the images of the color palette and/or portions thereof ("color-palette images"). Using the color-palette images and information retrieved from memory 114 that corresponds to colors expected to be in the color-palette images, the software-calibration routine may adjust the camera 104 and/or the display so that the colors of the color palette match, are consistent with or otherwise correspond to (collectively "match") virtual colors that are being imaged by the camera 104 and rendered on the display. This way, the virtual colors of other items captured by the camera 104 and rendered by the display match the physical colors of such items.

The calibration palette can have attributes other than color as well. Also, when the system 100 is included in the kiosk, the user or a system operator may adjust the system 100 to set and/or maintain a proper calibration of the colors. The calibration routine may be carried out (i) periodically; (ii) each time a user uses the system; (iii) upon an occurrence of a condition, such as an error or reset of the system 100, a change in lighting, a change or modification to the camera 104, a desire to use a different calibration palette; and/or (iv) any other time.

After process block 204, the process 200 transitions to process block 206. At process block 206, the system 100 obtains an image ("native image") that includes a rendering of the face, head and/or other portion of the body of the person ("body part"). The system 100 may obtain the native image, for example, from the camera 104 after the camera 104 (i) captures the native image via its image-capturing device, and (ii) transfers it to the image-processing system 102. To facilitate capturing the native image, the person whose body part is to be captured by the camera may be seated or otherwise positioned so that the body part of such person falls within the field of view of the camera 104. After being so positioned, the person or another user of the system 100 may trigger the camera 104 (e.g., by pressing a physical trigger, such a button; or by manipulating a virtual button on via a graphical user interface (not shown)) to capture the native image or "take a picture" of the body part of the person.

Alternatively, the system 100 may obtain the native image by importing it to the image-processing system 102 from one or more of the image sources 106. For example, the person whose body part is being captured or another user of the system 100 (hereinafter, collectively "user") may cause the image-processing system 102 to retrieve, from one or more of the image sources 106, at least one native image from one or more records stored therein. These records (collectively an "image record"), which may be stored in a single file or multiple files, may have been previously captured by the camera 104 and stored in memory on one or more of the image sources 106.

Alternatively, the image record may be generated by another camera, e.g., a stand-alone digital camera, stored in memory thereon and uploaded therefrom, streamed to or otherwise transferred to the image-processing system 102. As another alternative, the image record may be generated from a photograph that is scanned by an image-capturing device, such as a scanner, and uploaded or otherwise transferred to the image-processing system 102.

Figure 3:
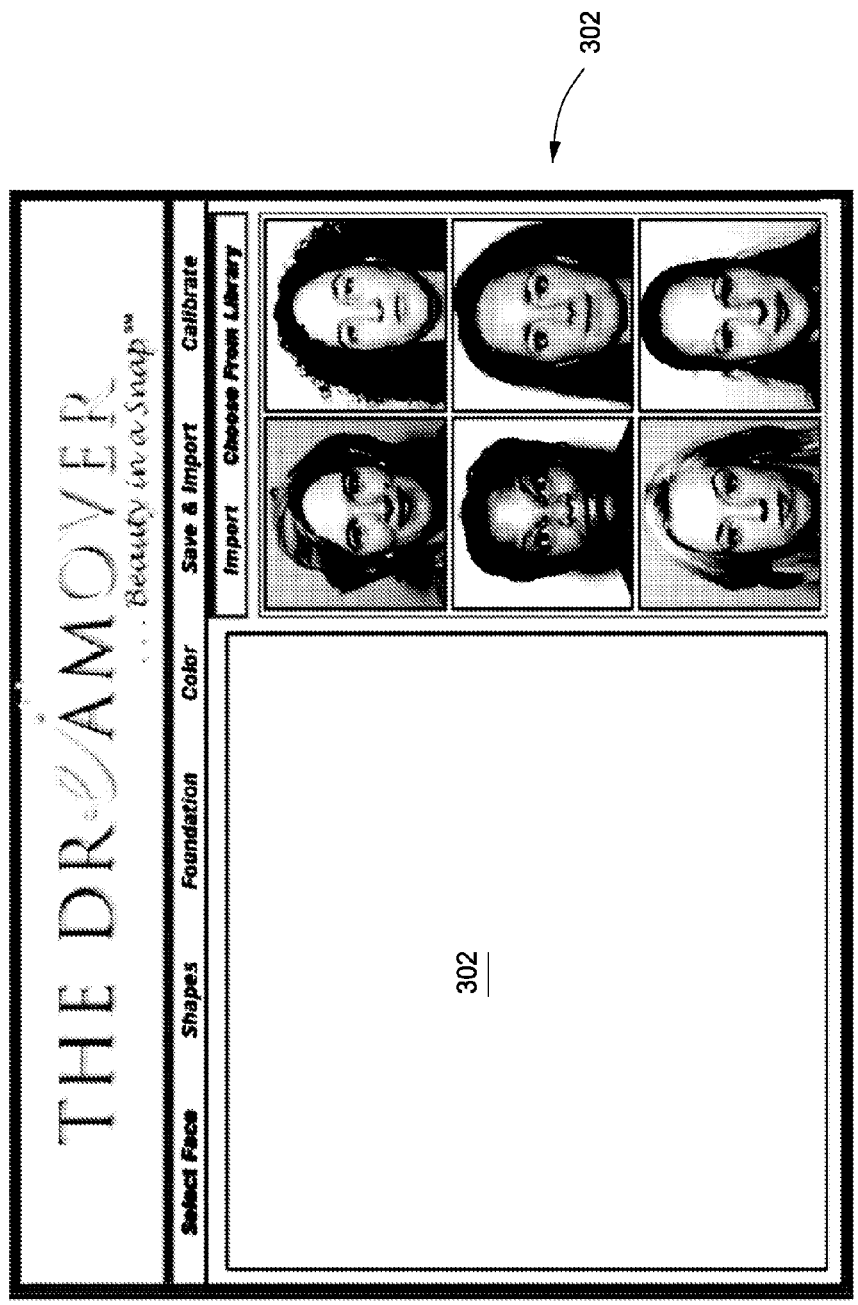
FIG. 3 is a display screen illustrating an example a library of images that may be used by the process for determining facial characteristics of a person.

As yet another alternative, the image record may be selected from a library, which includes information for rendering body parts of a number of people other than the user. The library may include, for example, a library of faces (as shown, for example, in FIG. 3). This library ("face library") includes information from which the image-processing system 102 is operable to render a gallery of faces. Each face rendered in the gallery has facial characteristics, structures, features and the like (collectively "facial characteristics") that are similar to, commensurate with or consistent with facial characteristics of a group of people expected to use the system 100 or some other sector of a population. This alternative allows the process 200 to be carried out without obtaining an actual image of the user.

To obtain the image record to be used, the user may select from the gallery one of the face renderings that has facial characteristic the same as, substantially the same as, or similar to the facial characteristics of the user. To select the one of face rendering, the user may use the graphical user interface ("GUI") of the image-processing system 102 to select (e.g., use a pointing device of the GUI, such as a mouse, to point and click on) one of the face renderings from menu 300, which may cause the face rendering so selected to appear on workspace window 302 of the GUI. Alternatively, the user may select and place the face rendering on the workspace window 302.

As a further alternative, the image record may be imported from one or more of the image sources 106 via the Internet or other network. In any case, the image record may be formatted in accordance with one or more formats, including, for example, Graphic Interchange Format ("GIF"), Joint Photographic Experts Group ("JPEG"), Tagged Image File Format ("TIFF"), Progressive Graphics File ("PGF"), Portable Network Graphics ("PNG"), bitmap ("BMP") and the like.

After the process block 206, the process 200 may transition to process block 210 or, alternatively, to process block 208. At process block 208, the image-processing system 102 operates on or "preprocesses" the native image. As described in more detail with reference to FIGS. 4 and 5, the image-processing system 102 may preprocess the native image so as to position the native image or portion thereof within the workspace window 302. The image-processing system 102 may, for example, preprocess the native image so as to enable the native image and/or the rendering of the face and/or other body part contained therein to be placed within a workspace window 302 in an optimal fashion.

After process block 206, as noted above, or after process block 208, the process 200 may transition to process block 210. At process block 210, the image-processing system 102 analyzes the native image (preprocessed or otherwise) to obtain one or more of the facial characteristics of the face rendering in the native image. This analysis ("facial-character analysis") may include creating a model that is formed from the facial characteristics of the face rendering in the native image.

The image-processing system 102 may, for example, carry out the facial-characteristic analysis by performing a shape analysis on the face rendering in the native image. The shape analysis may include, for example, identifying from the face rendering one or more shapes of facial characteristics. These shapes may include (i) an overall shape of the face; (ii) a shape of a portion of the face; (iii) a shape of one or more of the eyes or a portion thereof; (iii) a shape of the nose or portion thereof, (v) a shape of the mouth of portion thereof, (vi) a shape of one or more of the lips or a portion thereof, (vi) a shape of the hair or portion thereof, (vii) etc. The shape analysis may also include (i) creating, from the shape of the facial characteristics so identified, a mask; and (ii) integrating, incorporating or otherwise including the mask in the model. An example of the shape analysis is described below with reference to FIGS. 6A-6C.

Additionally and/or alternatively to the shape analysis, the image-processing system 102 may perform the facial-characteristic analysis to the native image to determine skin color and/or skin tones, eye color, hair color, etc. of the person; and/or to determine positioning among some or all of the face, eyes, nose, mouth lips, hair, etc. The image-processing system 102 may also perform the facial-characteristic analysis to obtain other details of the face rendering as well. Additional details of examples of the facial-characteristic analysis are described below with respect to FIGS. 6A-6C, 7, 8 and 9.

In addition to creating the model, the image-processing system 102 may integrate into or otherwise combine the model with the native image so as to form a processed image. Alternatively, the image-processing system 102 may keep the model separate from the native image, but store the model in memory 114 for reference during subsequent processing.

After process block 210, the process 200 may transition to process block 212. At process block 212, the system 100 uses the model to suggest, select and/or guide selection of one or more articles for the person to wear so as to enhancement to the appearance of the person. These articles may include, for example, makeup, jewelry, hair styles, hair coloring, eye glasses or contacts and other beauty accessories. Additional details of examples of using the model to suggest, select and/or guide selection of the articles is described below with respect to FIGS. 6A-6C, 7, 8 and 9.

After process block 212, the process 200 may transition to any of the process blocks 214, 216 and 218. At process block 214, the image processing system 102 may process the native image to identify and record or otherwise obtain and include within the model one or more regions ("objects") of the face rendering to which the articles may be applied. For example, the image-processing system 102 may define objects to which make-up, such as foundation, contour, eye liner, lipstick, etc. can be applied; or alternatively, define objects to which jewelry, eye glasses or contacts, hairstyles, hair colors, etc. can be applied.

As part of the processing ("object processing"), the image-processing system 102 may identify and record or otherwise obtain positioning, sizing, dimensioning and other details of the objects. The positioning sizing and/or dimensioning of the objects may be referenced with respect to a datum of the mask, a datum in the model, a datum of the native image, a datum of the processed image or any other reference. Additional details of examples of object processing are described below with respect to FIGS. 10A and 10B. After process block 214, the process 200 may transition to process block 216 or process block 218.

At process block 216, the image processing system 102 applies to the native image or the processed image, as a function of the model, one or more renderings of one or more of the articles ("article renderings"). This allows the user to view the article renderings in combination with the rendering of body parts in the native or processed images. After applying the articles to the image, the image-processing system 102 may integrate into or otherwise combine articles with the native or processed images to form a composite image. Alternatively, the image-processing system 102 may create the composite image separate from but using the renderings from the native image or processed image. The image processing system 102 may store the composite image in memory 114 for reference during subsequent processing. In addition, the image-processing system 102 may create a report listing details about the article renderings, suggestions for complementing the article renderings, suggestions based on the facial-characteristic analysis, etc. The details may include, for example, selected objects, recommended objects, characteristics of objects including color and opacity, object price and availability, dates and times, and user preferences and other profile information about the user including age, birthdate, personal color preferences, among others. After process block 216, the process 200 may transition to process block 218.

At process block 218, the image-processing system 102 may output the native, processed and/or composite images, and/or the report. The images and/or the report may be output as any or any combination of one or more electronic files, such as one or more audio files, one or more video files, information for causing a printout of hardcopy, and the like.

For example, the image-processing system 102 may output the images and/or report to a given media, such as memory 114, hard copy via a printer, an external memory card, etc. Alternatively, the image-processing system 102 may output the images and/or report (i) in or attached to an email or series of emails, (ii) in or attached to a multimedia presentation, (i) in or attached to a text message, (iv) to a business application, (v) etc. As such, the images and/or report may be transferred to devices, such as cell phones, computers, PDAs, and the like via the internet or another wired and/or wireless network. Additional details of examples of outputting the images and/or the report are described below with respect to FIGS. 10A and 10B.

Preprocessing Example

Figure 4:
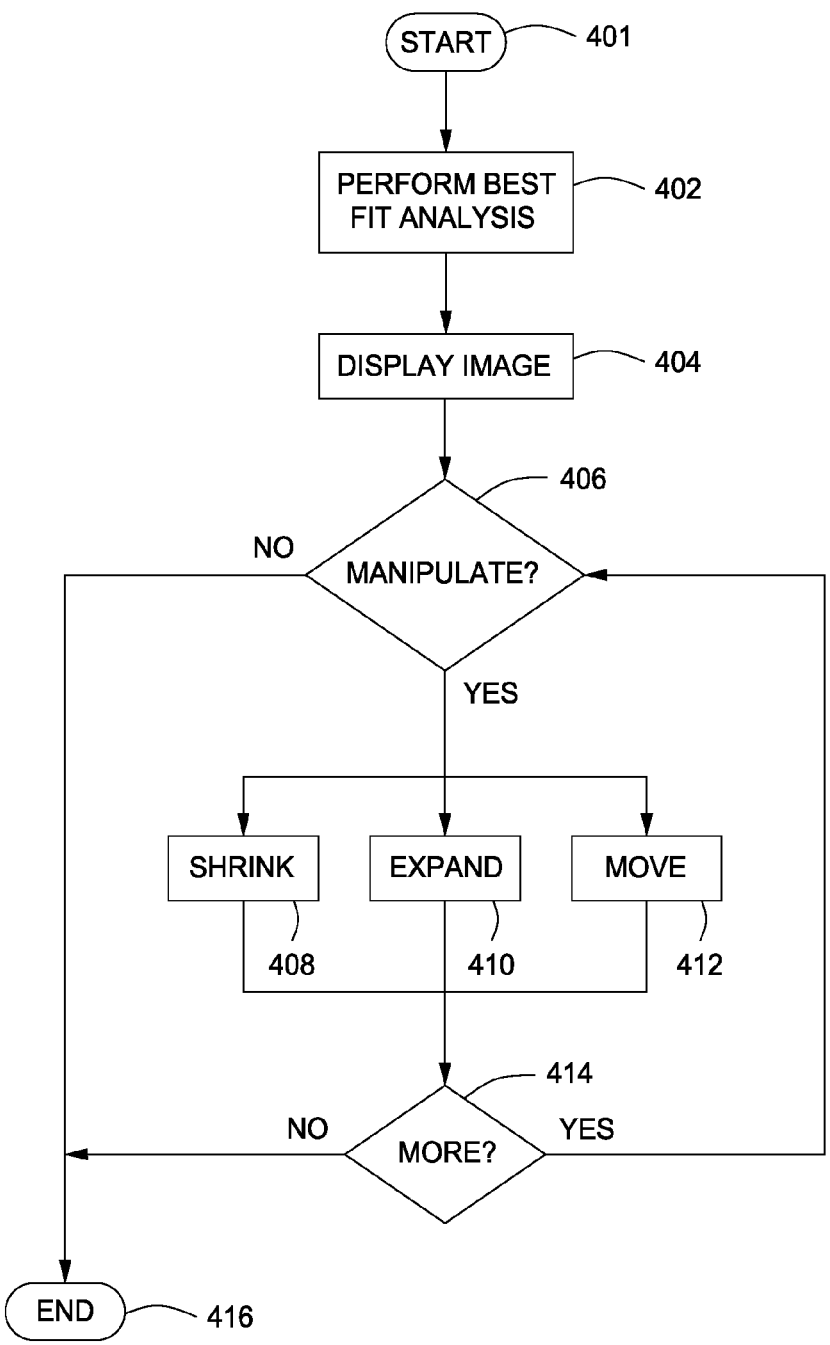
FIG. 4 is a flow diagram illustrating an example of a process for obtaining and preprocessing an image.

FIG. 4 is a flow diagram illustrating an example of a process 400 for obtaining and preprocessing an image. The process 400 may be used to carry out process block 208 of FIG. 2. For convenience, the process 400 is described with reference to the system 100 of FIG. 1. The process 400, however, may be carried out using other architectures as well.

The process 400 starts at termination block 401, whereupon the system 100 obtains the native image. The system

100 may obtain the native image as described above with respect to process block 206. After termination block 401, the process 400 transitions to process block 402.

At process block 402, the image-processing system 102 performs a best-fit analysis. The image processing system 102 may perform the best-fit analysis to fit or substantially fit the native image within the workspace window 302. The best-fit analysis fitting may be used to ensure that none of the face rendering is cropped by the workspace window 302 and/or that an aspect ratio of the native image is maintained within the workspace window. After process block 402, the process 400 transitions to process block 404.

At process block 404, the image-processing system 102 renders on the display a copy of the native image ("workspace image") after being fit into the workspace window 302. Details of the workspace window 302 may be displayed as well. After process block 404, the process 400 transitions to decision block 406.

At decision block 406, the image-processing system 102 queries the user as to whether manipulation of the workspace image is required and/or desired. If the user responds in the negative, then the process 400 transitions to termination block 416. If, on the other hand, the user responds in the affirmative, then the process 400 transitions from the process block 406 to process block 408, process block 410 or process block 412.

If the process 400 transitions to process block 408, the image-processing system 102 (with or without interaction from the user) may manipulate the workspace image using a function for shrinking the workspace image. Use of this function may cause the image-processing system 102 to form a manipulated image that is a shrunken version of the workspace image. After process block 408, the process 400 may transition back to decision block 406.

If, instead of transitioning to the process block 408, the process 400 transitions to process block 410, then the image-processing system 102 (with or without interaction from the user) may manipulate the workspace image using a function for expanding the workspace image so as to form a manipulated image that is a expanded version of the workspace image. After process block 410, the process 400 may transition back to decision block 406.

If, instead of transitioning to either of the process blocks 408 or 410, the process 400 transitions to process block 412, then the image-processing system 102 (with or without interaction from the user) may manipulate the workspace image using a function for positioning the workspace image (e.g., moving the image up, down and/or side-to-side; or rotating the image) within the workspace window 302 so as to form a manipulated image that is a repositioned version of the workspace image. After process block 412, the process 400 may transition back to decision block 406.

After transitioning back to decision block 406, the image-processing system 102 may query the user as to whether further manipulation of the manipulated image is desired or required. As above, if the user answers in the negative, then the process 400 transitions to termination block 416. If answered in the affirmative, however, the process 400 causes the image-processing system 102 to presents the user with access to one, some or all of the process blocks 408-412. As above, the user may select one or more of the process block 408-412 and further manipulate the workspace image.

Although the process 400, as shown, includes three process blocks having functions for manipulating the workspace image, the process 400 may include more, fewer or different process blocks having functions for manipulating the workspace image. These additional and/or different process blocks may have functions for deleting, pasting, editing, reforming, resizing, etc., the workspace image.

At termination block 416, the process 400 terminates. Alternatively, the process 400 may be repeated periodically (regularly or irregularly), in continuous fashion, or upon being triggered as a result of a condition, such as when the image-processing system 102 obtains a new native image.

Figure 5:
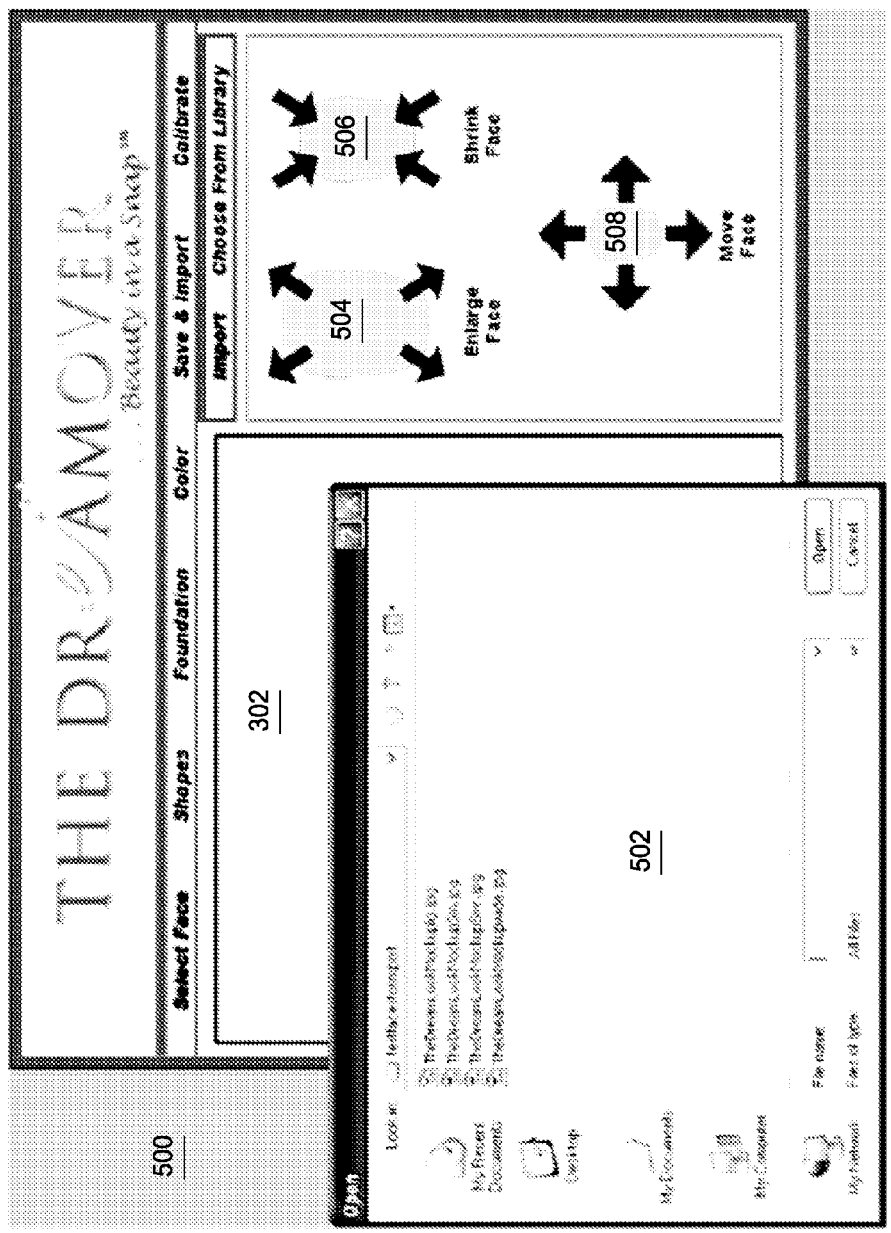
FIG. 5 is a display screen illustrating example graphical elements of a graphical-user interface that may be used by a process for obtaining and preprocessing an image.

With reference now to FIG. 5, a display screen is shown that illustrates example graphical elements of a graphical-user interface (GUI) 500 that may be used by a process for obtaining and preprocessing an image. The user interface 500 is described with reference to the process 400 of FIG. 4 and the system 100 of FIG. 1 for convenience. The user interface 500, however, may be used with other processes and architectures for obtaining and preprocessing an image as well.

In sequence with process 400 at termination block 401, the user selects a native image using dialog box 502. After selection, the image-processing system 102 may perform the best-fit analysis to fit the native image to the workspace window 302 (process block 402). After performing the best-fit analysis, the image-processing system 102 may display the workspace image in the workspace window 302 (process block 404).

At some point, the image-processing system 102 renders on a pane or window of the GUI 500 one or more of buttons or icons for manipulating the workspace image (decision block 402). As shown, the GUI 500 includes three icons. These icons are an enlarge icon 504, a shrink icon 506, and/or a move icon 508.

Upon selection of the enlarge icon 504 or the shrink icon 506, the image-processing system 102 (with or without interaction by the user) shrinks or expands the size of the workspace image, respectively, (process blocks 408 and 410). Upon selection of the move icon 508, the image-processing system 102 (with or without interaction by the user) may move some or all of workspace image up, down and/or side-to-side within the workspace window 302 (process block 412). Each of the enlarge, shrink, and/or move icons 508-508 may be selected in any order, and may be repeatedly selected for additional manipulation. With each selection, the image-processing system 102 may incrementally shrink, expand, rotate or otherwise reposition the workspace image.

Facial-Characteristics Analysis Example

Figure 6A:
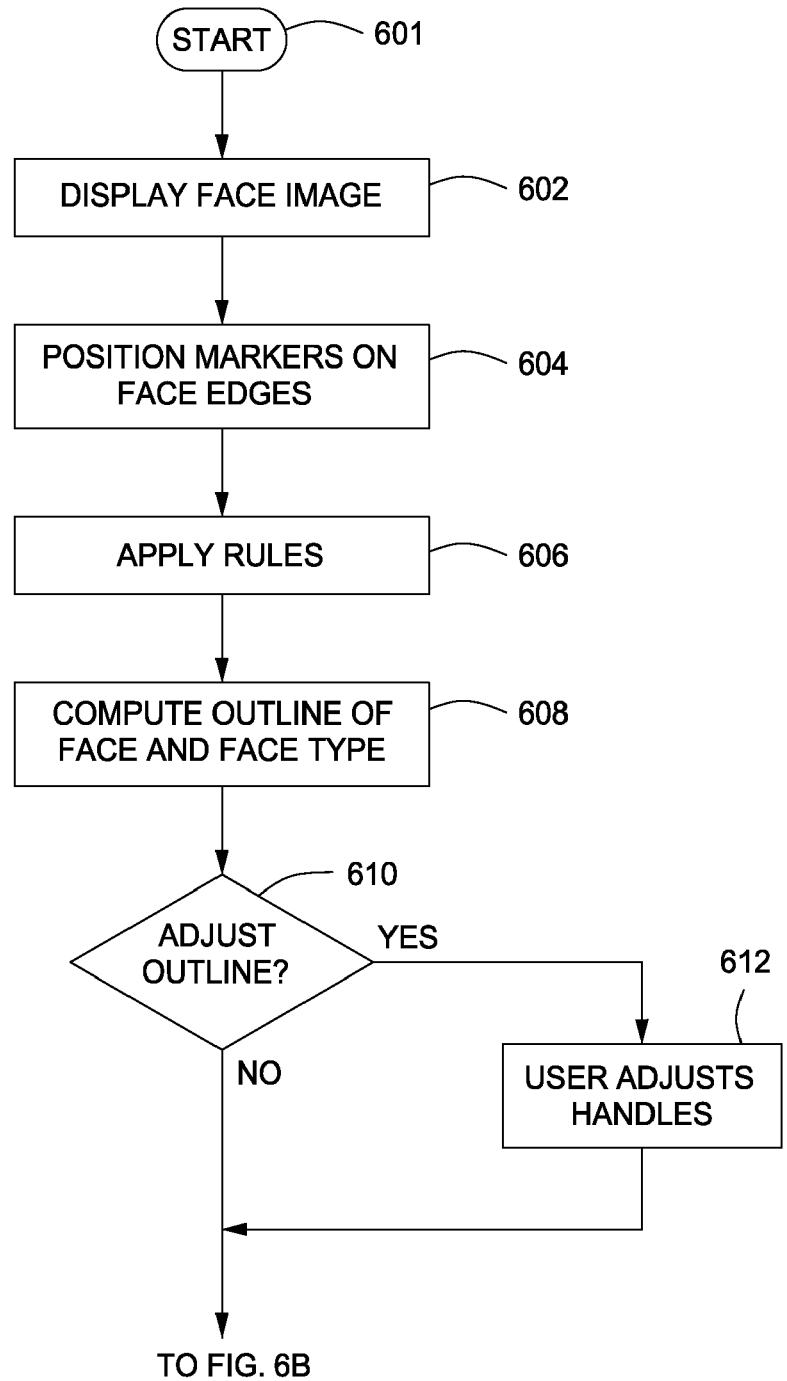
Figure 6C:
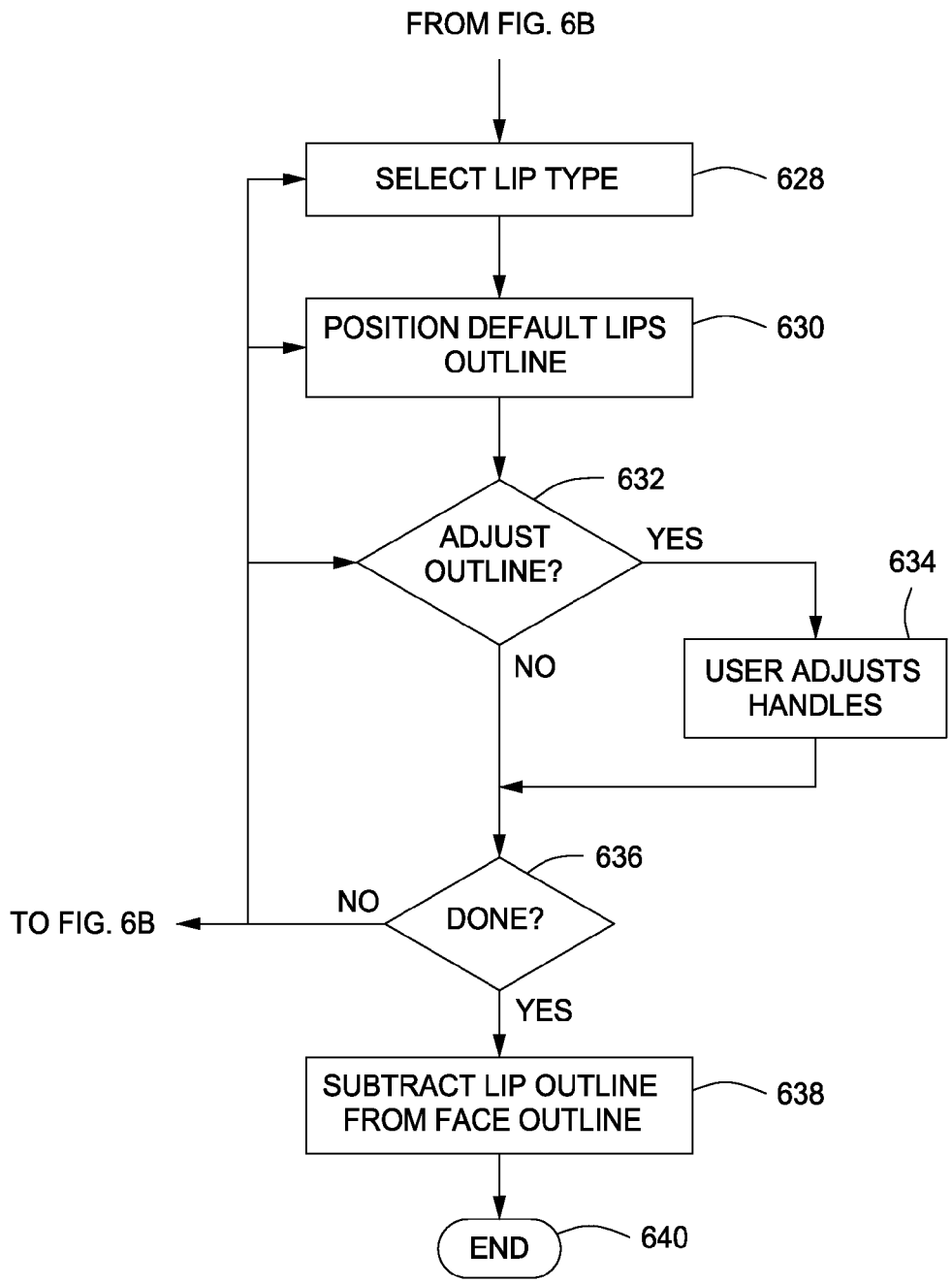

FIGS. 6A, 6B and 6C are a flow diagram illustrating an example of a process for 600 performing a shape analysis of a rendering of a face in an image. The process 600 may be used to carry out process block 210 of FIG. 2. For convenience, the process 600 is described with reference to the system 100 of FIG. 1. The process 600, however, may be carried out using other architectures as well.

The process 600 starts at termination block 601 and then transitions to process block 602. At process block 602, the image-processing system 102 renders on the display the face rendering of the native, preprocessed and/or workspace image. After process block 602, the process transitions to process block 604.

At process block 604, the image-processing system 102 (with or without interaction by the user) may position one or more markers, targets and/or handles on one or more edges the face. After process block 604, the process 600 transitions to process block 606.

At process block 606, the image-processing system 102 may apply one or more rules that are relevant to one or more user requests and/or to the face or other body part rendering in the native, preprocessed and/or workspace image. After process block 606, the process 600 transitions to process block 608.

At process block 608, the image-processing system 102 may compute from the face rendering an outline of the face ("face outline"), and may determine from the outline rendering a type of face ("face type") corresponding to the face rendering. After process block 608, the process 600 transitions to decision block 610.

At decision block 610, the image-processing system 102 may query whether the adjustment of the face outline is required or desired. If answered in the negative, the process 600 transitions to decision block 614 (FIG. 6B). If on the other hand, the query is answered in the affirmative, the process 600 transitions to process block 612.

At process block 612, the image-processing system 102 provides the user with access to one or more markers, targets and/or handles on or otherwise associated with the face outline that may be repositioned to adjust the face outline. Using these markers, targets and/or handles, the user in combination with the image-processing system 102 may adjust position, size, and/or dimensions of the face outline. After process block 612, the process transitions to decision block 614 (FIG. 6B).

At process block 614, the image-processing system 102 (with or without interaction from the user) may perform a check to determine if one or more of the eyes or the lips of the face rendering need to be positioned or repositioned. If answered affirmative with respect to the lips, the process 600 transitions to process block 628 (FIG. 6C). Otherwise the process 600 transitions to process block 616.

At process block 616, the image-processing system 102 (with or without interaction by the user) selects from information in memory 114 a type of eye ("eye type") that matches one or more of the eyes in the face rendering. After selecting the eye type, the image-processing system 102 renders on the native, processed or workspace image a repositionable outline of the eye type ("repositionable-eye outline"). After process block 616, the process 600 transitions to process block 618.

In process block 618, the image-processing system 102 (with or without interaction by the user) positions the repositionable-eye outline on, near or in a vicinity of one or more of the eyes of the face rendering. After process block 618, the process 600 transitions to decision block 620.

At decision block 620, the image-processing system 102 (with or without interaction from the user) checks if the repositionable-eye outline requires adjustment. If answered in the negative, the process 600 transitions to decision block 624. If, however, answered in the affirmative, the process 600 transitions to process block 622.

At process block 622, the image-processing system 102 provides the user with access to one or more markers, targets and/or handles attached to or otherwise associated with the repositionable-eye outline so as to allow the user to adjust the face outline. By repositioning these markers, targets and/or handles, the user in combination with the image-processing system 102 may adjust position, size, and/or dimensions of the repositionable-eye outline. After process block 622, the process 600 may transition to decision block 624.

At decision block 624, the image-processing system 102 (with or without interaction from the user) checks whether the eye outlining is complete. If answered in the negative, the process 600 transitions to back to any of process blocks 616, 618 and 622 and repeats as described above. If answered in the affirmative, the process 600 transitions to process block 626.

At process block 626, the image-processing system 102 subtracts the repositionable-eye outline from the face outline.

After process block 626, the process 600 may transition to process block 628 (FIG. 6C) or termination block 629.

At termination block 629, the image-processing system 102 creates the mask from the face outline and the subtraction of the eye outline from the face outline. In addition, the image processing system 102 incorporates the mask into the model, after which the process 600 terminates. Alternatively, the process 600 may be repeated periodically (regularly or irregularly), in continuous fashion, or upon being triggered as a result of a condition, such as when the image-processing system 102 obtains a new native image.

At process block 628 (FIG. 6C), the image-processing system 102 (with or without interaction by the user) selects from information in memory 114 a type of lip ("lip type") that matches one or more of the lips of the face rendering. After selecting the lip type, the image-processing system 102 renders on the native, processed or workspace image a repositionable outline of the lip type ("repositionable-lip outline"). After process block 628, the process 600 transitions to process block 630.

At process block 630, the image-processing system 102 (with or without interaction by the user) positions the repositionable-lip outline on, near or in a vicinity of one or more of the lips of the face rendering. After process block 630, the process 600 transitions to decision block 632.

At decision block 632, the image-processing system 102 (with or without interaction from the user) checks if the repositionable-lip outline requires adjustment. If answered in the negative, the process 600 transitions to decision block 636. If, however, answered in the affirmative, the process 600 transitions to process block 634.

At process block 634, the image-processing system 102 provides the user with access to one or more markers, targets and/or handles attached to or otherwise associated with the repositionable-lip outline so as to allow the user to adjust the face outline. By repositioning the markers, targets and/or handles, the user in combination with the image-processing system 102 may adjust position, size, and/or dimensions of the repositionable-lip outline. After process block 622, the process 600 may transition to decision block 636.

At decision block 636, the image-processing system 102 (with or without interaction from the user) checks whether the lip outlining is complete. If answered in the negative, the process 600 transitions to back to any of process blocks 628, 630 and 634 and repeats as described above. If answered in the affirmative, the process 600 transitions to process block 638.

At process block 638, the image-processing system 102 subtracts the repositionable-lip outline from the face outline. After process block 638, the process 600 may transition to termination block 640.

At termination block 640, the image-processing system 102 creates the mask (or modifies a mask previously created) from the face outline and the subtraction of the eye outline and the lip outline from the face outline. In addition, the image processing system 102 incorporates the mask into the model, after which the process 600 terminates. Alternatively, the process 600 may be repeated periodically (regularly or irregularly), in continuous fashion, or upon being triggered as a result of a condition, such as when the image-processing system 102 obtains a new native image.

Figure 7:
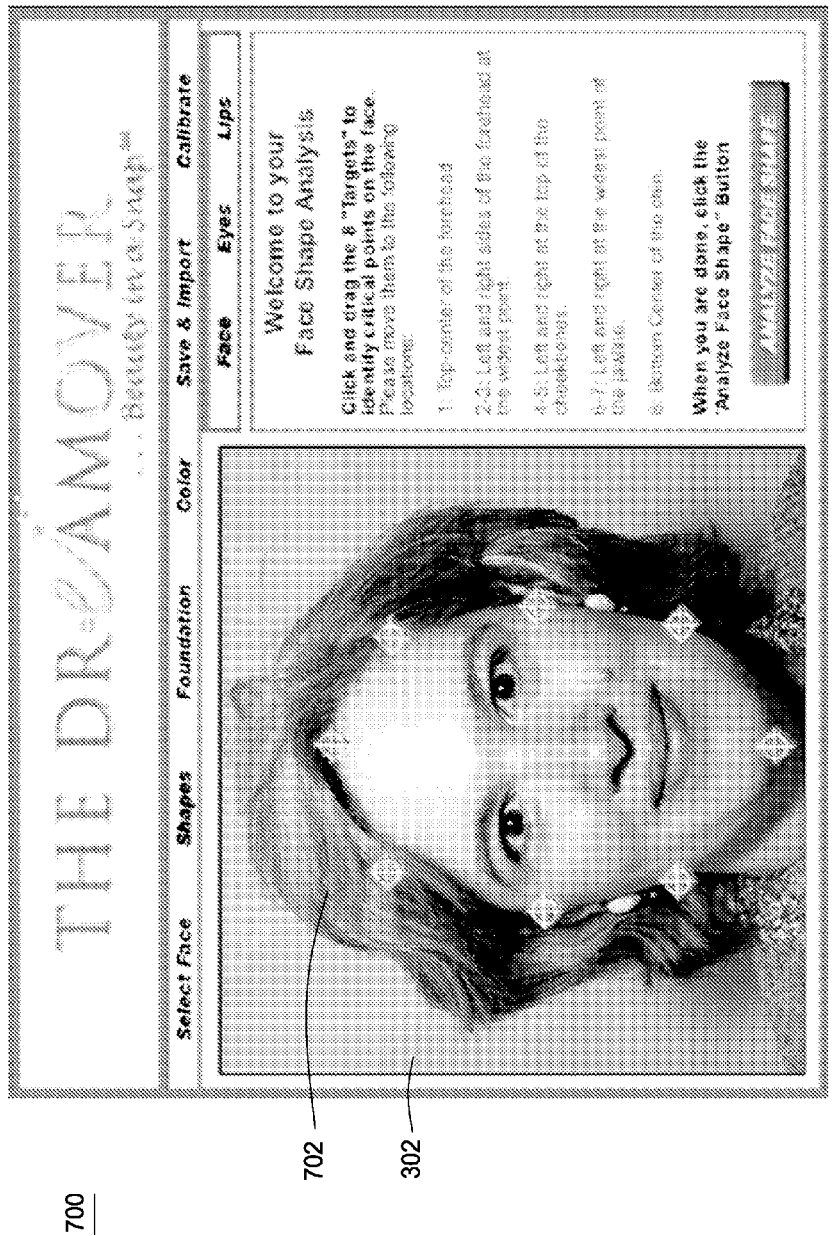
FIG. 7 is a display screen illustrating example graphical elements of a graphical-user interface that may be used by a process for computing an outline of a rendering of a face.

With reference now to FIG. 7, a display screen is shown that illustrates example graphical elements of a GUI 700 that may be used by a process for computing an outline of a rendering of a face. The GUI 700 is described with reference to the process 600 of FIG. 6 and the system 100 of FIG. 1 for convenience. The GUI 700, however, may be used with other processes and architectures as well.

In accordance with process 600 at process block 602, the image-processing system 102 displays in the workspace window 302 of the GUI 700, the face rendering of a native, processed or the workspace image. After displaying the face rendering, the image-processing system 102 instructs the user, via the GUI 700, to manipulate the GUI 700 to position one or more markers, targets or handles (collectively "targets") 702 on, near or in a vicinity of one or more edges of the face rendering ("face edges") so as to identify and/or delineate the face edges (process block 602 and 604). As shown in FIG. 7, the image-processing system 102 may instruct the user to position each of the targets 702 appearing in the workspace window 302 on a given position on the face rendering.

The user may place the targets 702 by dragging and/or dropping each of the targets 702 to the given position. Thereafter, the image-processing system 102 may use the targets 702 so positioned determine the shape of the face and/or form the face outline.

For example, after positioning the targets 702 is completed, the image-processing system 102 may apply one or more rules to such positioning; the outcome of which allows the image-processing system 102 to identify an overall shape of the face (processing block 606). In addition, the image-processing system 102 may use the rules and/or the positioning of the targets 702 to compute the face outline and/or determine the face type (processing blocks 606 and 608).

Although eight targets are shown on the GUI 700 in FIG. 7, more or fewer targets may be used to for determining the shape of the face rendering. In addition, the shape, mask and model may be defined in two-dimensional form, three dimensional form, etc.

Figure 8:
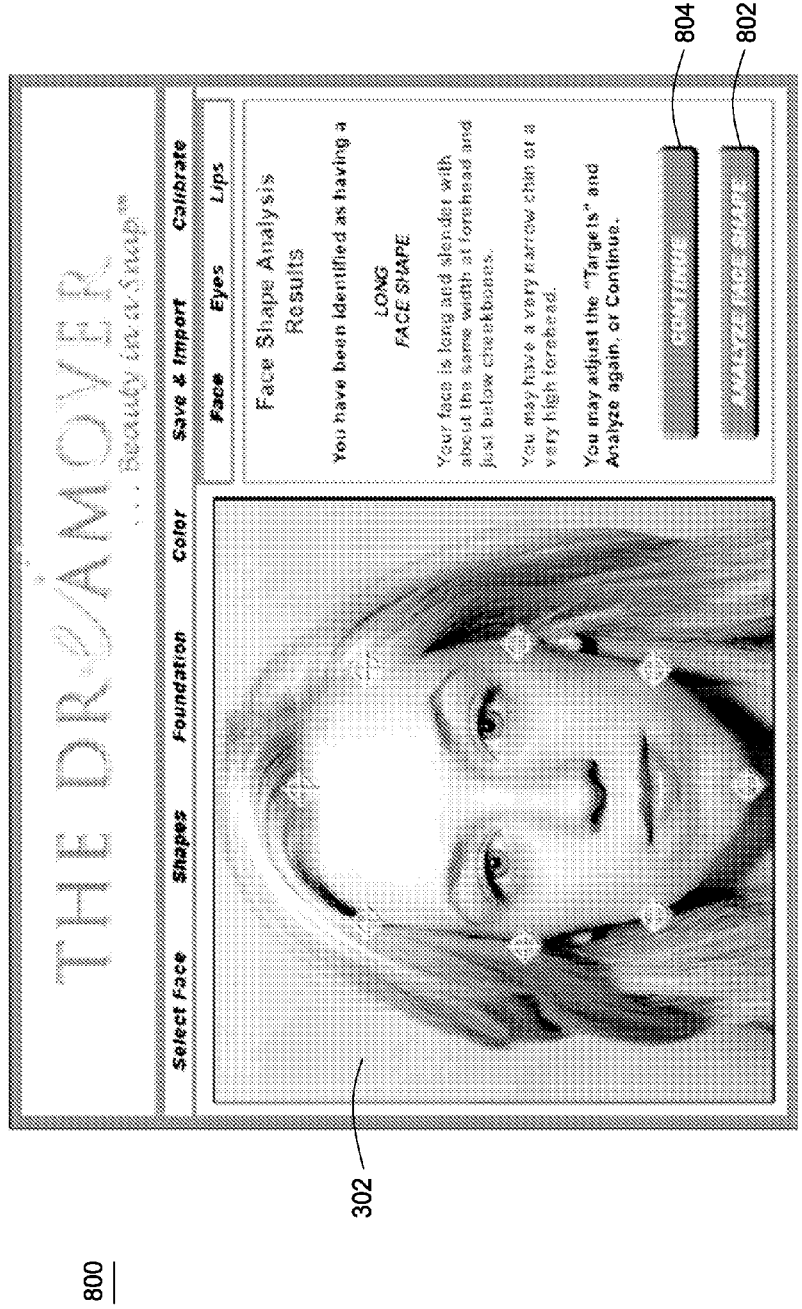
FIG. 8 is a display screen illustrating example graphical elements of a graphical-user interface that may be used by a process for determining a face shape of a rendering of a face.

Referring to FIG. 8, a display screen is shown that illustrates example graphical elements of a GUI 800 that may be used by a process for determining a face shape of a rendering of a face. The GUI 800 is described with reference to the process 600 of FIG. 6 and the system 100 of FIG. 1 for convenience. The GUI 800, however, may be used with other processes and architectures as well.

In accordance with process 600 at process block 608, the image-processing system 102 identifies the face type of the face rendering shown in the workspace window 302 of FIG. 8 as a long-face shape. Where appropriate, the image-processing system 102 may identify the face type of the face rendering as a square shape, a pear shape, a heart shape, a round shape or an oval shape, for instance. Those skilled in the art may utilize any number of rules to determine various other face shapes. Any number of face shapes can be added to the analysis. Such additional shapes may be added via upload of a software improvement or through a release of a new software version.

After determining the face type, the image-processing system 102 may allow the user to adjust the targets 702. The image-processing system 102 may also render on the GUI 800 a button 802; the selection of which causes the image-processing system to again analyze the face shape. The button 802 may be selected after adjusting the targets 702 or at any other time. In addition, the image-processing system 102 may render on the GUI 800 another button 804 for continuing with the shape analysis.

Figure 9:
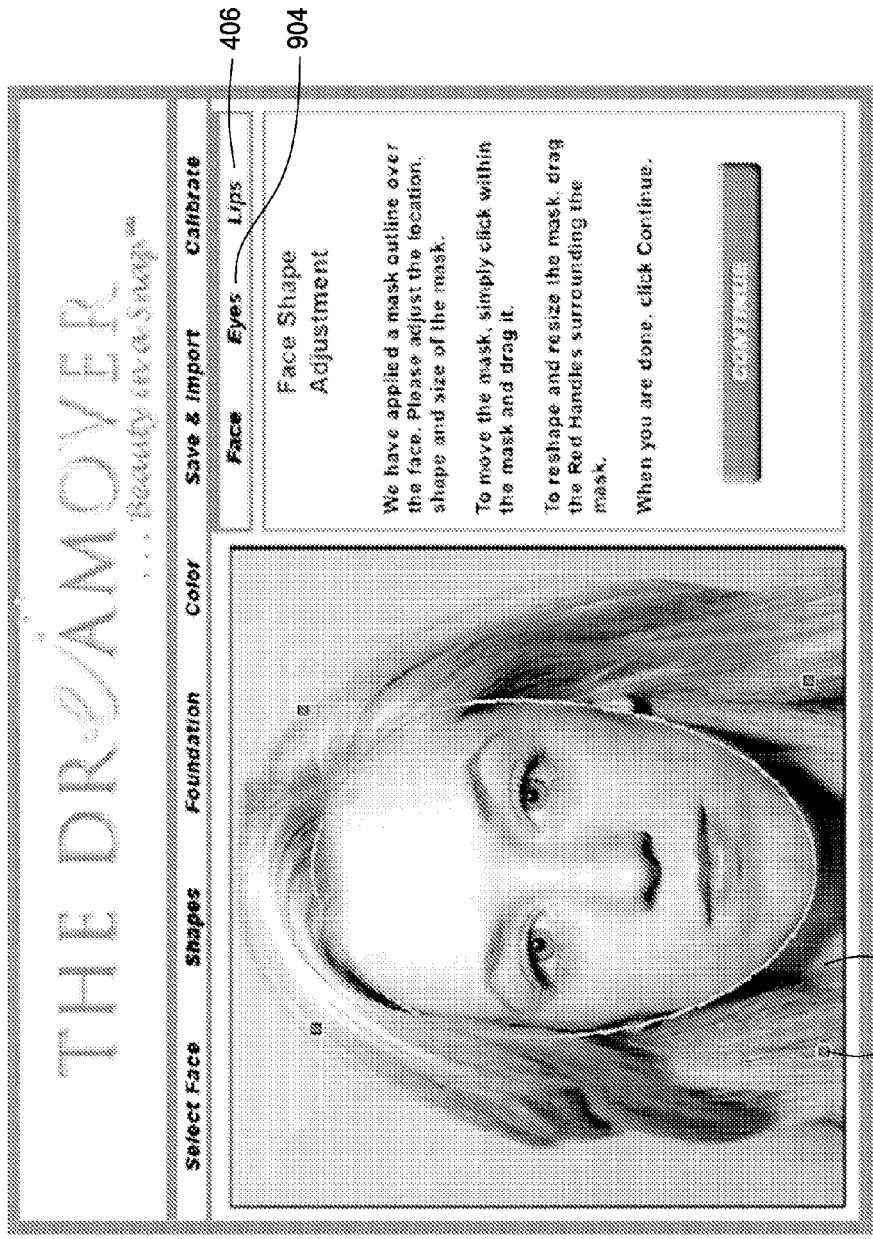
FIG. 9 is a display screen illustrating example graphical elements of a graphical-user interface that may be used by a process for applying a mask to a rendering of a face.

FIG. 9 is a display screen illustrating example graphical elements of a GUI 900 that may be used by a process for applying a mask to a rendering of a face. The GUI 900 is described with reference to the process 600 of FIG. 6 and the system 100 of FIG. 1 for convenience. The GUI 900, however, may be used with other processes and architectures as well.

In accordance with process 600 at process block 610, the image-processing system 102 overlays the mask (shown in FIG. 9 at 901) upon the face rendering. In addition, the image-processing system 102 provides via the GUI 900 manipulation handles 902. The image-processing system 102 provides the manipulation handles 902 to enable the user to manipulate the mask 901 to fit and/or align the mask to the face edges. By fitting and/or aligning the mask 901 to the face edges, the image-processing system 102 is operable to control subsequent application of articles to the face or other part renderings. For example, the fitting and/or aligning of the mask to the face edges allows the image-processing system 102 to limit the regions and locations on the face and/or body part rendering to which articles, such as makeup, is applied.

The image-processing system 102 may, for example, allow the user to adjust the handles 902 such that the image-processing system 102 can perform a best fit of the mask. Additionally and/or alternatively, each of the handles 902 may move independently of each other, such that true-shape skewing is possible.

The GUI 900 also includes buttons 904 and 906 for processing, respectively, one or more of the eyes of the face rendering and one or more of the lips of the face rendering. Upon selection of the button 904, the image-processing system 102 may render on the GUI 900 a gallery of eye types from which the user may select. The gallery may include a number of the repositionable-eye outlines. The repositionable-eye outlines may be defined such that the eyes in the outlines are widely spaced apart, narrowly spaced apart, slanted, round, sunken, hooded and the like.

Upon selection of a given repositionable-eye outline, the image-processing system 102 renders the given repositionable-eye outline. The given repositionable-eye outline should be selected such that it corresponds to the eye type of the eyes in the face rendering (process block 616).

After rendering the repositionable-eye outlines, the image-processing system 102 enables the GUI 900 to accept input from the user to position the repositionable-eye outline on, near and/or in the vicinity of one of the eyes of the face rendering (process block 618). In addition, image-processing system 102 enables the GUI 900 to accept input from the user to adjust the given repositionable-eye outline to best fit or match the characteristics of the eyes in the face rendering. To facilitate adjusting the given repositionable-eye outline, the GUI 900 may overlay the given repositionable-eye outline on the image, and allow the user to adjust handles for each eye region to best fit the given repositionable-eye outline to the best fit or match the characteristics of the eyes in the face rendering.

Although the foregoing describes the repositionable-eye outline as an outline of one or more of the eyes, the repositionable-eye outline may be divided into two or more of the objects. For example, the repositionable-eye outline may include two objects, namely, a first object and a second object. The first object may represent a region corresponding to an upper portion of one or more of the eyes, and the second object may represent a region corresponding to a lower portion of one or more of the eyes.

In addition, each of the objects may contain sub-objects or further gradations to which different articles can be applied. For example, the objects may include sub-objects defining different regions into which articles containing separate colors—highlight shades, mid-tone shades, accent shades, eyeliner, mascara, etc. may be applied. These sub-objects, although they can have different articles applied thereto (e.g., different colored makeup or different type of makeup), may be grouped into its parent object shape such that when the object is manipulated, the sub-objects are manipulated in the same proportions.

After determining the face shape, eye shape and/or lip shape, the image-processing system 102 may create the mask and incorporate the mask into the model (process blocks 629 and 640). Using this model, the image-processing system 102 may suggest, guide and/or allow the user to select from pre-selected menus one or more articles for application to the face and/or body part renderings. For example, the image-processing system 102 may suggest, guide the user to and/or provide menus having (i) particular color combinations for makeup; (ii) placement locations for the makeup; (iii) jewelry suggestions; (iv) glasses or contact suggestions; (v) hair style or hair color suggestions; or (vi) any other suggestions that will enhance the appearance of the person.

Object Processing Example

Figure 10A:
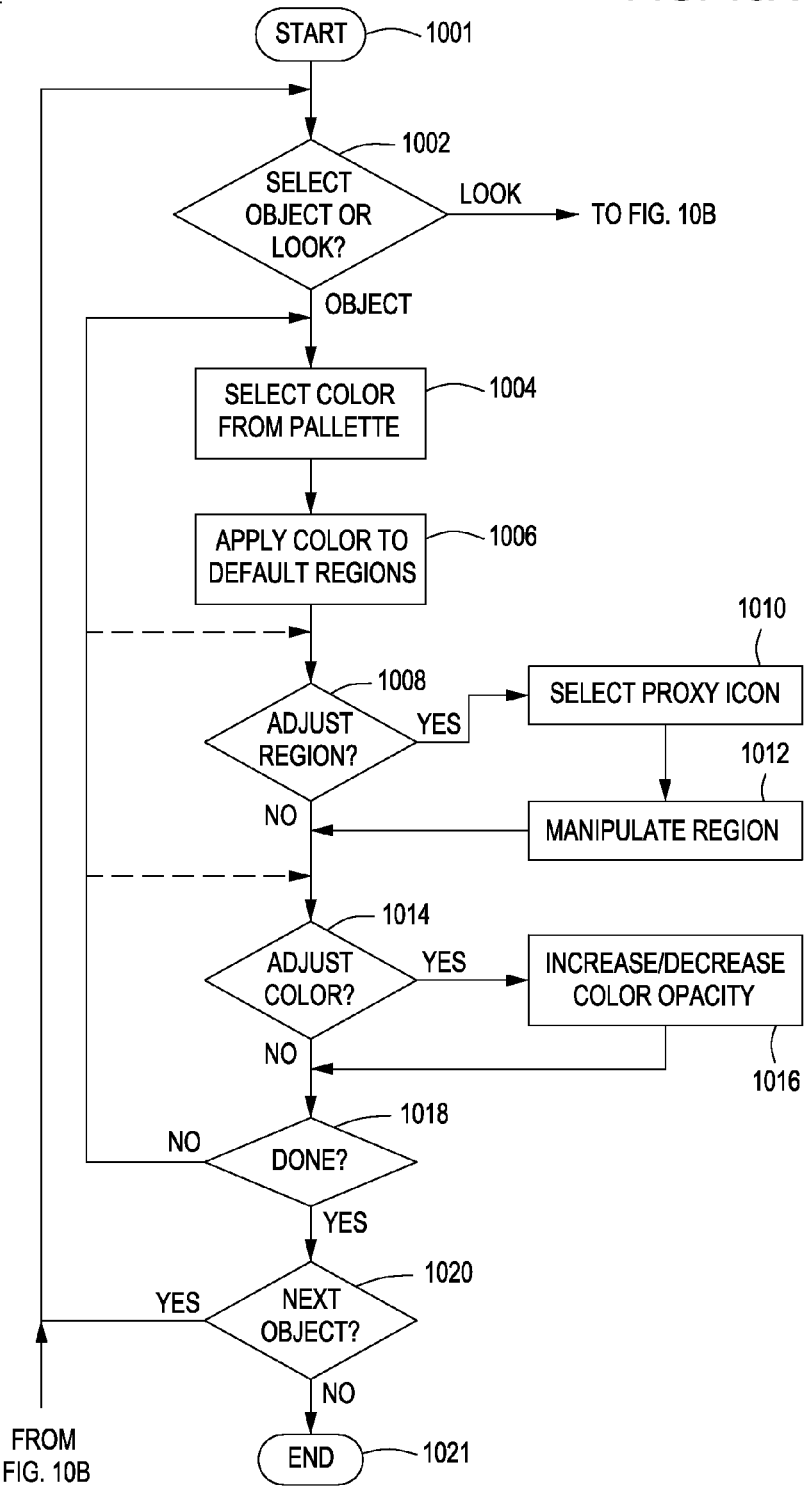
FIGS. 10A and 10B are a flow diagram illustrating an example of a process for object processing of an image.
Figure 10B:
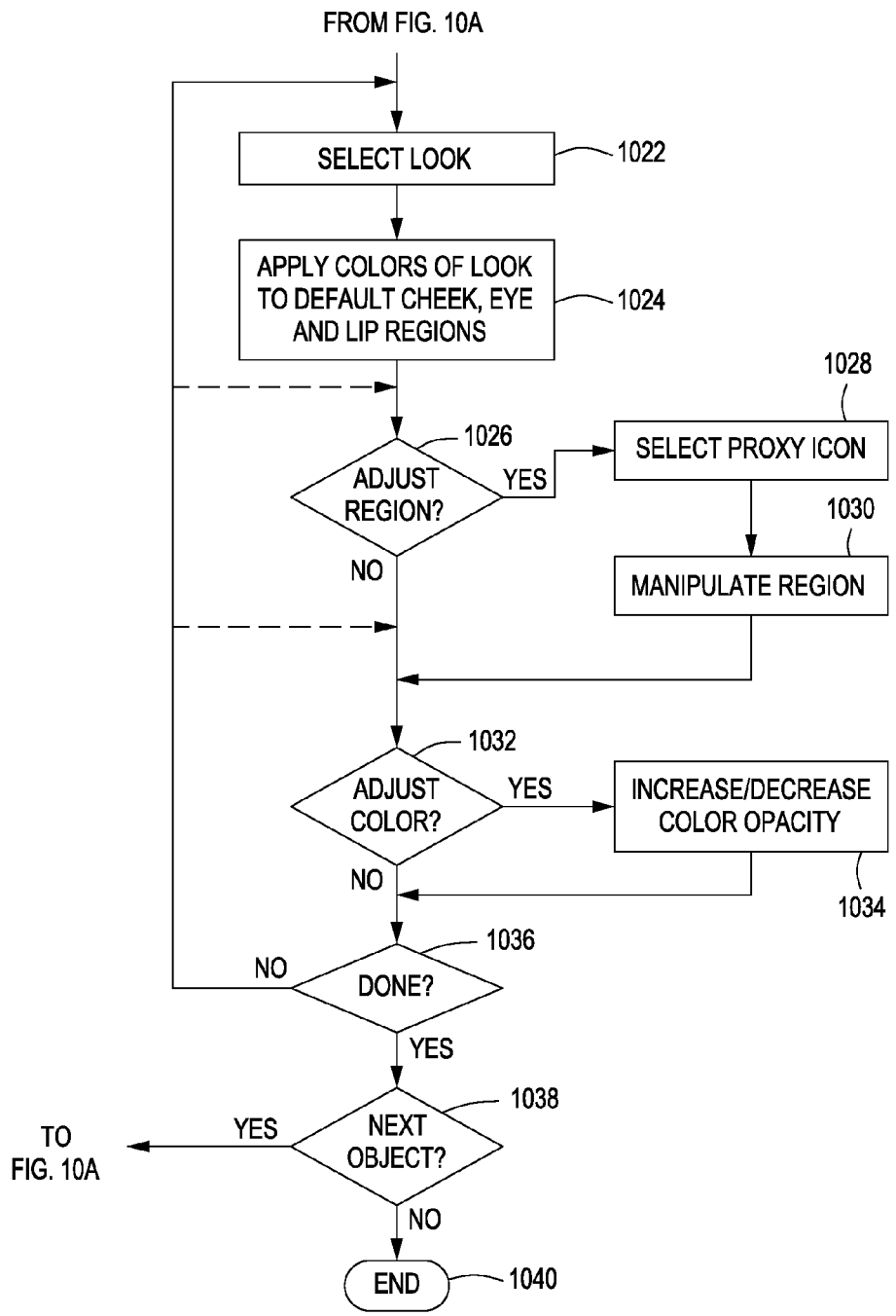

FIGS. 10A and 10B are a flow diagram illustrating an example of a process 1000 for object processing of an image. The process 1000 may be used to carry out process block 214 of FIG. 2. For convenience, the process 1000 is described with reference to the system 100 of FIG. 1. The process 1000, however, may be carried out using other architectures as well.

The process 1000 starts at termination block 1001 and transitions to decision block 1002. At decision block 1002, the image-processing system 102 checks if a user wishes to select (i) a "look" for application of articles to one or more objects of the face and/or body renderings or (ii) select one or more individual objects for application articles thereto. If the user selects the "look," then the method 1000 transitions to process block 1022 (FIG. 10B). If, on the other hand, the user selects the objects, then the process 1000 transitions to process block 1004.

At process block 1004, the image-processing system 102 via input from the user selects one or more of the articles, such as colors from a given palette. Thereafter, at process block 1006, the image-processing system 102 applies the articles to the objects defined in the model. After process block 1006, the process 1000 transitions to decision block 1008.

At decision block 1008, the image-processing system 102 checks if adjustment of the objects is desired or needed. If answered in the negative, the process 1000 transitions to decision block 1014. If answered affirmatively, the process 1000 transitions to process block 1010. At process block 1010, the image-processing system 102, via input from the user, selects a proxy icon. After process block 1010, the process 1000 transitions to process block 1012, where the image-processing system 102, via input from the user, manipulates the objects. After process block 1012, the process 1000 transitions to decision block 1014.

At decision block 1014, the image-processing system 102 checks if adjustment of the articles applied to the objects is desired or needed. If answered in the negative, the process 1000 transitions to decision block 1018. If answered affirmatively, the process 1000 transitions to process block 1016. At process block 1016, the image-processing system 102, with or without input from the user, adjusts one or more attributes of the articles (e.g., increases or decreases opacity or otherwise adjusts other attributes of the color applied to the objects). After process block 1016, the process 1000 transitions to process block 1018.

At process block 1018, the image-processing system 102 queries the user as to whether further adjustment to the articles is desired or needed. If answered affirmatively, the process 1000 returns to the process blocks 1004, 1008, and/or 1014, as needed or desired. If answered in the negative, the process 1000 proceeds to decision block 1020.

At decision block 1020, the image-processing system 1000 checks whether additional objects are to be processed. If answered affirmatively, the process 1000 returns to process block 1002. Otherwise, the process 1000 transitions to termination block 1021, at which point the process 1000 terminates. Alternatively, the process 1000 may be repeated periodically (regularly or irregularly), in continuous fashion, or upon being triggered as a result of a condition, such as when the image-processing system 102 obtains a new native image.

With reference now to FIG. 10B, the process 1000 transitions to process block 1022 when the look is selected in process block 1002. At process block 1022, the image-processing system 102 via input from the user selects a given look from a gallery of "looks." These looks may include an evening look, holiday look, morning look, daytime look, office look, sports look, seasonal look and any other "look" that might be attractive to a user. The looks may be associated with the facial characteristics of the face rendering. For makeup, a look may contain, for example, articles such as cheek color, eyeliner, highlights, mid-tone, accent, mascara, lipstick, lip-gloss, and lip liner. The various looks can be updated by download from the network to keep them up to date, i.e., fresh. After process block 1022, the process transitions to process block 1024.

At process block 1024, the image-processing system applies the articles of the look to the objects of the model, which may include the cheeks, eyes, and/or lips of the face rendering. After process block 1024, the process 1000 transitions to decision block 1026.

At process block 1026, the image-processing system 102 checks whether adjustment of the objects is desired or needed. If answered in the negative, the process 1000 transitions to decision block 1032. If answered affirmatively, the process 1000 proceeds to process block 1028. At process block 1028, the image-processing system 102, via input from the user, selects a proxy icon. At process block 1030, the image-processing system 102, via input from the user, manipulates the objects. After process block 1030, the process 1000 transitions to decision block 1032.

At decision block 1032, the image-processing system 102 queries the user as to whether the adjustment of one or more articles of the look is desired or needed. If answered in the negative, the process 1000 transitions to decision block 1036. If answered in the affirmative, the process 1000 transitions to process block 1034.

At process block 1034, the image-processing system 102, with or without input from the user, adjusts one or more attributes of the articles. For example, the image-processing system 102 may increase or decrease opacity or otherwise adjusts other attributes of the colors of the look applied to the objects. After process block 1034, the process 1000 transitions to process block 1036.

At process block 1036, the image-processing system 102 queries the user as to whether further adjustment to the articles of the look is desired or needed. If answered affirmatively, the process 1000 returns to the process blocks 1024, 1028, 1030 and/or 1034, as needed or desired. If answered in the negative, the process 1000 proceeds to decision block 1034.

At decision block 1034, the image-processing system 1000 checks whether additional objects are to be processed. If answered affirmatively, the process 1000 returns to process block 1002. Otherwise, the process 1000 transitions to termination block 1040, at which point the process 1000 terminates. Alternatively, the process 1000 may be repeated periodically (regularly or irregularly), in continuous fashion, or upon being triggered as a result of a condition, such as when the image-processing system 102 obtains a new native image.

Figure 11:
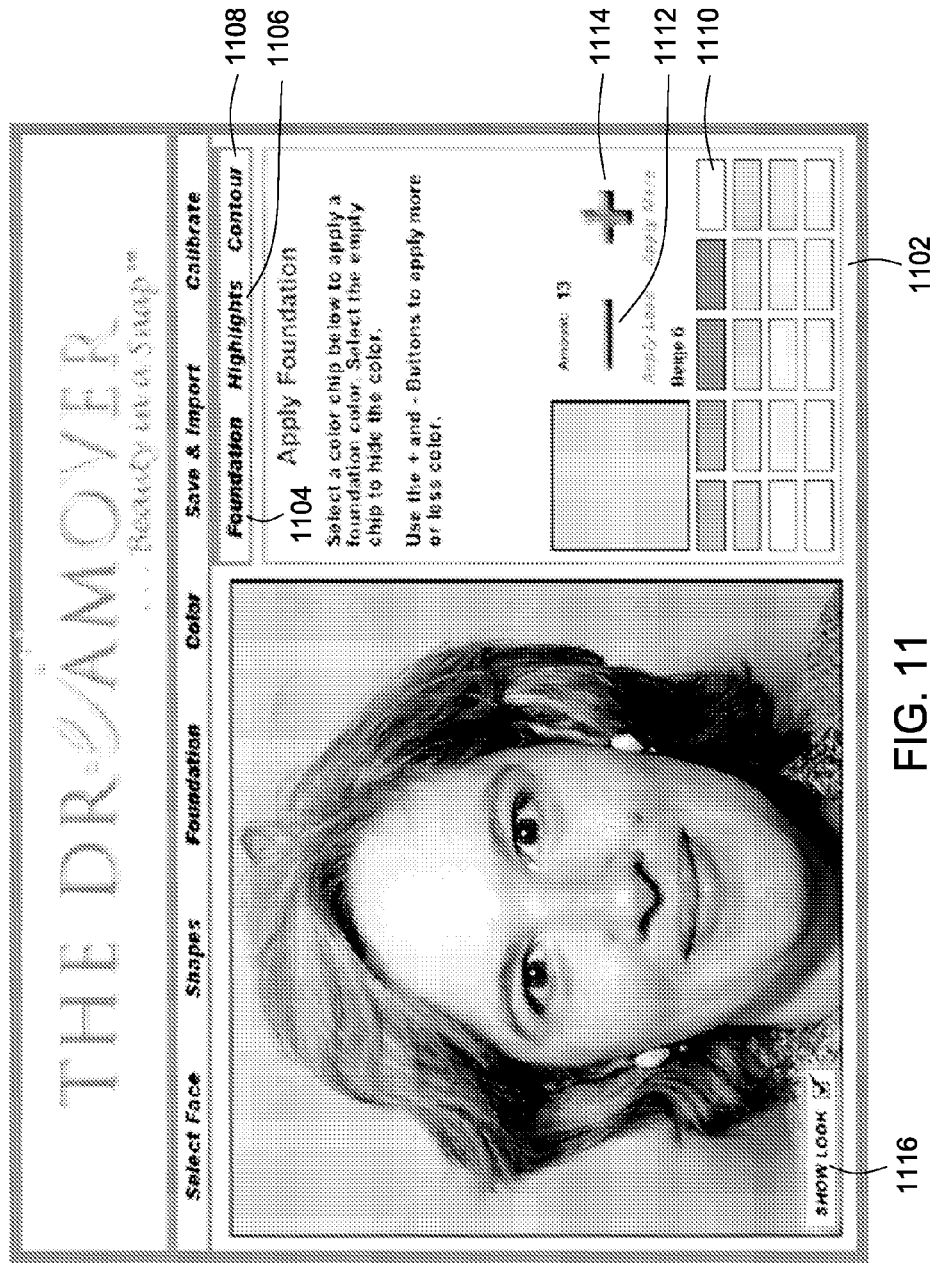
FIG. 11 is a display screen illustrating an example of a user interface for applying foundation to a rendering of a face in an image.

With reference now to FIG. 11, a display screen is shown that illustrates example graphical elements of a GUI 1100 that may be used by a process for applying one or more articles to a rendering of a face. The GUI 1100 is described with reference to the process 1000 of FIGS. 10A-10B and the system 100 of FIG. 1 for convenience. The GUI 1100, however, may be used with other processes and architectures as well.

The image-processing system 102, responding to the user selecting a button 1104 on the GUI 1100, renders on the display a color palette 1102 for applying different colored virtual foundations to one or more of the objects on the face rendering. Responding to selection of a given colored virtual foundation, the image-processing system 102 renders the given colored virtual foundation on the face rendering. The image-processing system 102 may render the given colored virtual foundation uniformly across the face rendering in accordance with the mask and/or model. Alternatively, the image-processing system 102 may render the given colored virtual foundation using true three-dimensional shading. In any case, the image-processing system 102 may render the given colored virtual foundation so that any shading of the face or any other of the article renderings positioned underneath this rendering appears through so as to ensure a life-like appearance. The user may change the color of the foundation by selecting other colors in the palette 1102.

If the user selects any of the colored virtual foundation from the color palette 1102, the image-processing system 102 may also display a suggested look, which is formed as a function of the selected colored virtual foundation and the facial-characteristic analysis. Such option may be enabled by the user selecting (e.g., tick marking) a button 1116 for rendering the suggested look on the face rendering.

If the user selects the clear box 1110, then the imagine-processing system 102 clears the given colored virtual foundation from the face rendering, thereby allowing the user to switch between no foundation and the given colored virtual foundation color. This allows the user to compare the face rendering with the virtual foundation and without the virtual foundation. In addition, the image-processing system 102 may increase or decrease the amount of the given colored virtual foundation rendered on the face rendering responsive to the user selecting minus and plus icons 1112 and 1114, respectively.

As an alternative to foundation, the image-processing system 102 may also render on the display other color palettes (not shown) for applying different colored highlights to and/or contouring of the foundation in response to the user selecting highlight and contour buttons 1106 and 1108, respectively. Other article buttons may be included as well, such as, buttons for jewelry type, eye glasses, hair style or any of the other beauty accessories that may be used to enhance the appearance of the user.

Figure 12:
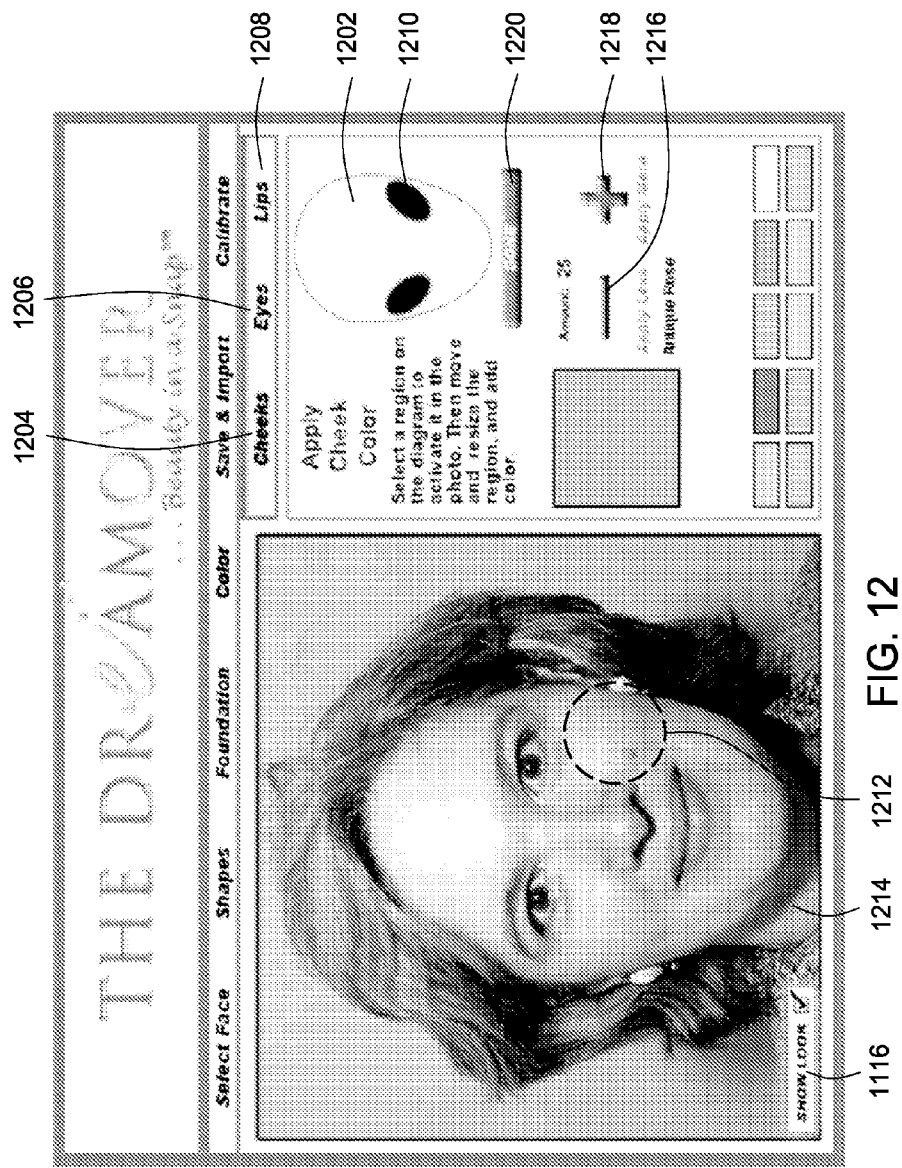
FIG. 12 is a display screen illustrating example graphical elements of a graphical-user interface that may be used for object processing.

With reference now to FIG. 12, a display screen is shown that illustrates example graphical elements of a GUI 1200 that may be used for object processing. The GUI 1200 is described with reference to the process 1000 of FIGS. 10A-10B and the system 100 of FIG. 1 for convenience. The GUI 1200, however, may be used with other processes and architectures as well.

The image-processing system 102 may select an object, such as a cheek object, in response to the user selecting a cheek-selection button 1204 on the GUI 1200. In addition, the image-processing system 102 renders on the GUI 1200 a proxy icon 1202.

Responsive to the user selecting one or both cheek regions 1210a-1210b on the proxy icon 1202, the image-processing system 102 activates the corresponding cheek object or cheeks objects on the face rendering. The user may independently select either one of the cheek regions 1210a-1210b or, alternatively, both of the cheek regions 1210a-1210b.

Assuming that, for simplicity of exposition, only cheek region 1210a is selected, then the image-processing system 102 activates the cheek object 1212 on the face rendering. When activated, the image-processing system 102 may cause the GUI 1200 to highlight cheek object 1212, and to provide manipulation handles 1214. Responsive to the user manipulating the handles 1214, the image-processing system 1102 may change the size, shape, position and/or location of the cheek object 1212. By manipulating the check object 1212, the user can better fit the cheek articles, such as color, to the cheek object 1212 in accordance with the facial characteristics and/or the facial-characteristic analysis.

FIG. 12 also includes minus and plus icons 1216 and 1218. Response to the user selecting the plus icon 1216, the image-processing system 102 may adjust articles applied to the cheek object 1212. For example, the image-processing system 102 may increase the opacity of colors of the articles applied to the cheek object 1212. Conversely, the image-processing system 102 may decrease opacity of colors of the articles applied to the cheek object 1212 responsive to the user selecting the plus icon 1216.

Alternatively and/or additionally, the image-processing system 102 may blend overlaid colors of articles with underlying colors of articles at a chosen opacity. Such blending allows the face rendering to approximate real life application of makeup to the face of the person.

In addition to the other buttons, the GUI 1200 may also include a button for completing the application ("done button") 1220. Responsive to the user selecting the done button 1220, the image-processing system 102 completes the application of articles to the cheek object 1212. After completion, the user can select a different object, such as eyes or lips, to which articles may be applied. To facilitate selecting the eyes and lips objects, the GUI 1200 includes an eye-selection button 1204 and a lips-selection button 1208. As above, these and other objects can have applied thereto any number of the articles, including jewelry of a particular type; eye glasses of various shapes, sizes, and colors; hair styles or hair colors; additional types of makeup; etc.

Figure 13:
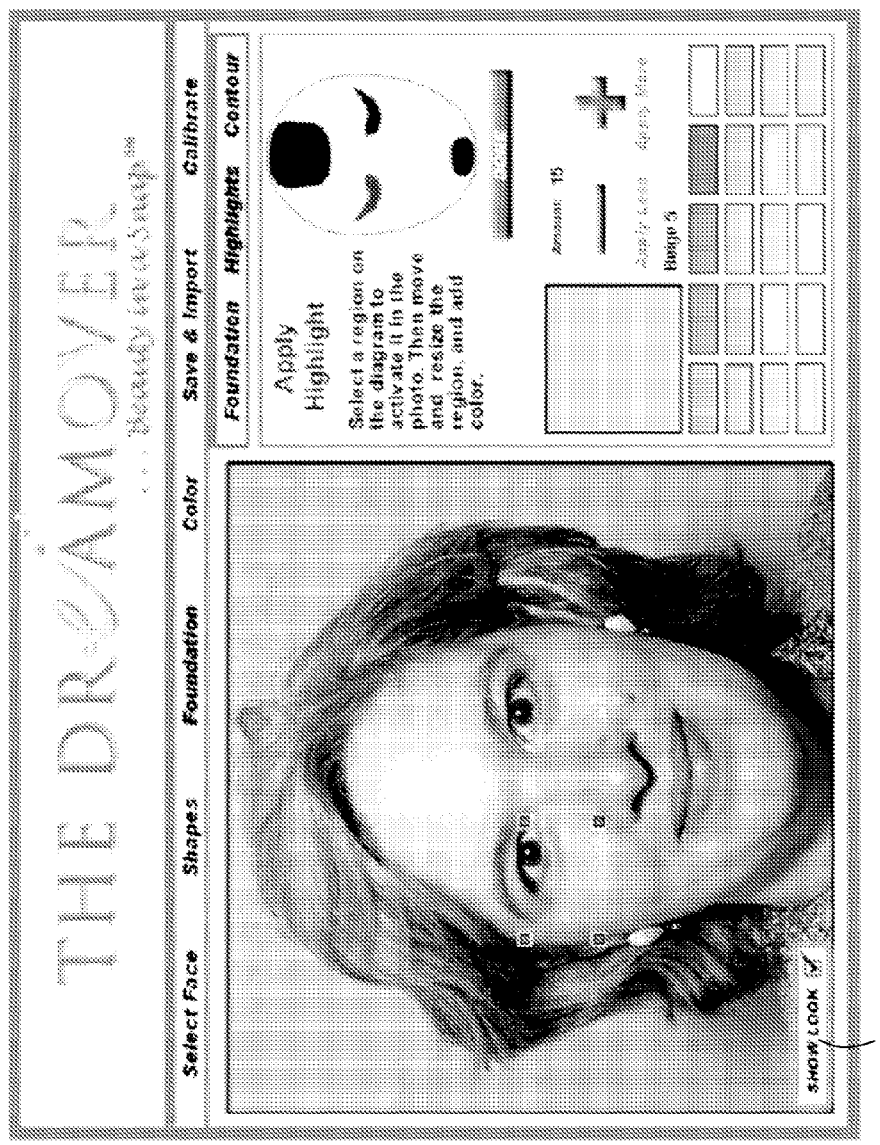
FIG. 13 is a display screen illustrating example graphical elements of a graphical-user interface that may be used for object processing.
Figure 14:
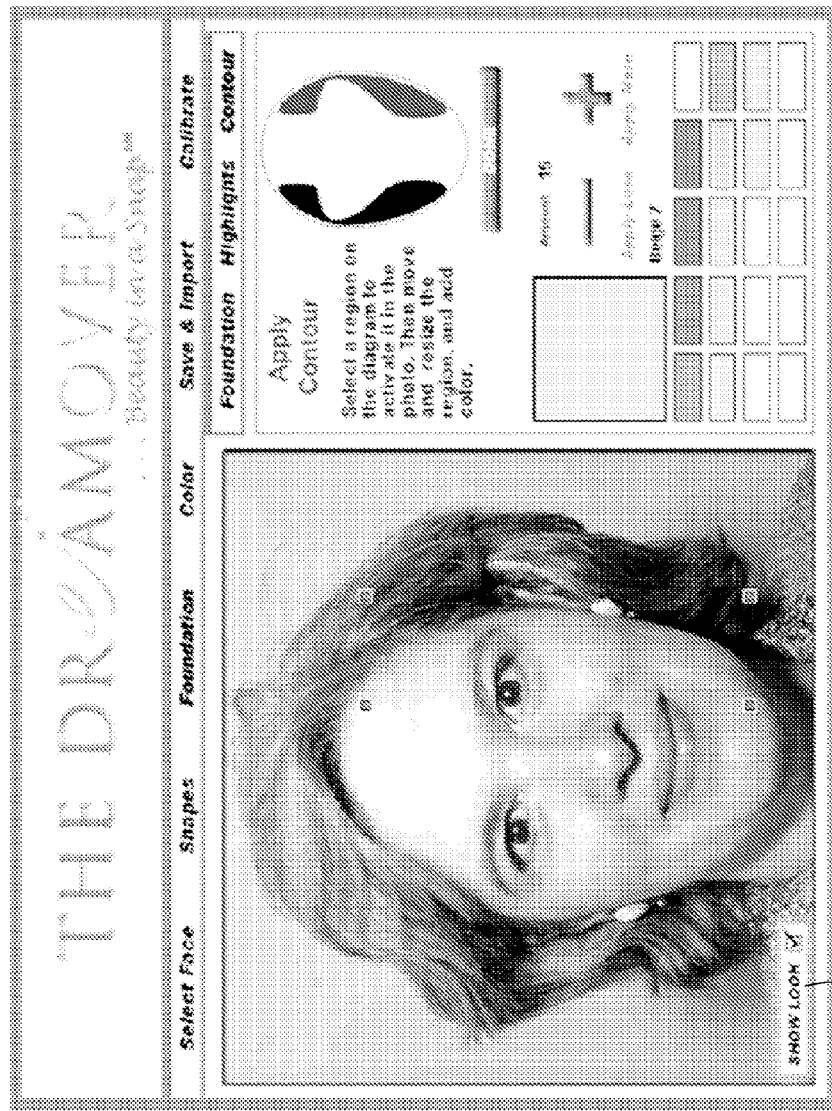
FIG. 14 is a display screen illustrating example graphical elements of a graphical-user interface that may be used for object processing.

FIGS. 13 and 14 are display screens illustrating example graphical elements of GUIs 1300, 1400, respectively, which may be used for object processing. The object processing that may be carried out using the GUI 1300 is directed to applying and adjusting colors of highlights within the foundation depending on the object selected. The object processing that may be carried out using the GUI 1400 is directed to contouring the foundation by selecting additional colors. Like above, the GUIs 1300 and 1400 may include buttons that cause the image-processing system 102 to allow the user to adjust the highlight shape and the contour shape using the handles. In addition, each of the GUIs 1200-1400 may include the "show-look" box 1116, which as noted above can be selected or deselected. In addition, individual color components of a look can be turned off either by selecting a "null" color to be applied to the objects or by reducing, minimizing or eliminating the opacity of the color applied to an object.

Figure 15:
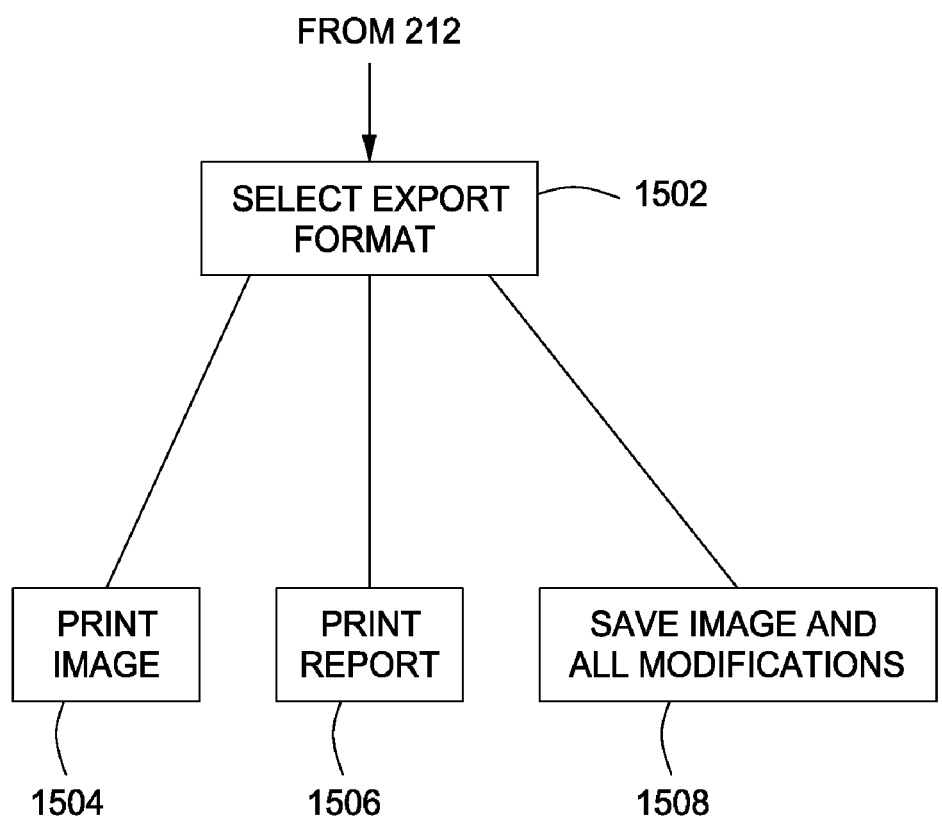
FIG. 15 is a flow diagram illustrating an example of a process for outputting an image and/or a report.

FIG. 15 is a flow diagram illustrating an example of a process 1500 for outputting an image and/or a report. The process 1500 may be used to carry out process block 218 of FIG. 2. For convenience, the process 1500 is described with reference to the system 100 of FIG. 1. The process 1500, however, may be carried out using other architectures as well.

At process block 1502, the user may select various formats for outputting the native, processed and/or workspace images, and/or the report. At process block 1504, the image-processing system 102 may output the images and/or report to a local, network, or remote printer. As noted above, the report may contain some or all of the objects and information about the articles applied thereto. This information may include the colors of the articles, model numbers or information for indentifying the model numbers, color identification for various manufacturers, and other information that allows the user to easily pick out and purchase the articles (e.g., makeup, jewelry, eye glasses, or other accessories) that have been selected.

At step 1508, the image-processing system 102 may save the images and/or report to memory 114 at any time so that the user may return at another time to resume where he or she left off or to make further adjustments. The save function may cause the image-processing system 102 to save the information locally in memory 114 or remotely on another memory; place it on a disc or CD; send it by email or otherwise to the a computer of the user computer and the like.

When output, the images and/or report may be separated into one record or more than one record. For example, all information describing shape, size and location of various enhancement objects may be stored in one record along with the image record that such objects are connected with. The selected colors and object opacity amounts that have been applied to the face rendering may be stored in a different record along with the size and colors of any other accessories applied to the face rendering, which in their entirety may compose one of the "looks." This record may be rendered by the image-processing system 102 in the gallery of looks or otherwise made available through the user interface for later application.

Additionally, the report may be tied to a point of purchase system, where a "Buy Now" button or other like function allows a user to purchase some or all of the suggested products.

As has been previously discussed, the system may be used for selecting colors for makeup to be place upon a subject; however, the system may also be used to identify attractive hair color or hair styles; types, styles and/or sizes of eyeglasses; types, styles and/or sizes of jewelry; or various combinations of any of these various accessories that can be used to enhance the appearance of a subject.

Conclusion

Variations of the apparatus and method described above are possible without departing from the scope of the invention. For instance, in the examples described above, controllers and other devices containing processors are noted. These devices may contain at least one Central Processing Unit ("CPU") and a memory. In accordance with the practices of persons skilled in the art of computer programming, reference to acts and symbolic representations of operations, instructions or code may be performed by the various CPUs and memories. Such acts and operations, instructions or code may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the examples are not limited to the above-mentioned memories and that other platforms and memories may support the described methods.

In view of the wide variety of embodiments that can be applied, it should be understood that the illustrated examples are exemplary only, and should not be taken as limiting the scope of the following claims. Further, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A computerized method, comprising:
    obtaining an image that includes a rendering of a face or body part of a person using at least one computing device, wherein the rendering is at least one of the person's image or a proxy image representing a person;
    analyzing the image to obtain at least one characteristic of the rendering of the face or body part using the at least one computing device, wherein the at least one characteristic comprises a shape associated therewith;
    wherein the outline of the shape is defined by a given number of dimensions;
    wherein the shape of the at least one characteristic is selected from the group of (i) the face, (ii) at least one eye, (iii) a nose, (iv) a mouth, (v) at least one lip, (vi) an ear, or (vii) hair;
    forming, as a function of the at least one characteristic, a model of the rendering of the face or body part using the at least one computing device;
    wherein forming the model, as a function of the characteristic, includes adjusting the predetermined shape to be consistent with the given number of dimensions;
    processing the image to obtain at least one region of the rendering of the face or body part using the at least one computing device;
    including in the model the at least one region using the at least one computing device; and
    using the model to select at least one article using the at least one computing device.

2. The method of claim 1, wherein the rendering comprises a proxy image representing a person generated from the actual image of the person or a proxy image selected from a library of images.

3. The method of claim 2, wherein using the model to select at least one article comprises applying, to the image, a rendering of the at least one article.

4. The method of claim 3, further comprising:
forming an output image, wherein the output image includes the image having the rendering of the face and the rendering of the at least one article; and
outputting the output image to a given media so as to allow for re-rendering of the image with the rendering of the face and the rendering of the at least one article.

5. The method of claim 1, wherein using the model to select at least one article comprises:
providing, as a function of the model, a plurality of articles for the person; and
selecting from the plurality of articles the at least one article for the person.

6. The method of claim 1, further comprising:
processing the image to obtain at least one region of the rendering of the face; and
including in the model the at least one region, wherein using the model to select at least one article for the person comprises:
selecting the at least one region; and
applying to the at least one region a rendering of the at least one article.

7. The method of claim 1, wherein obtaining the image comprises: at least one of (i) obtaining the image from a storage medium, and (ii) obtaining the image from an image capturing device.

8. The method of claim 1, wherein forming the model as a function of the plurality of characteristics comprises:
determining an outline of the shape;
selecting, from a plurality of predetermined shapes, a predetermined shape that is consistent with the outline; and
applying, to the image, the predetermined shape, wherein the predetermined shape is positioned in the image at substantially the same place as the outline of the shape.

9. The method of claim 8, wherein at least one of the plurality of characteristics comprises a shape associated therewith.

10. The method of claim 9, wherein the outline of the shape is defined by a given number of dimensions, and wherein forming the model as a function of the plurality of characteristics further comprises: adjusting the predetermined shape to be consistent with the given number of dimensions.

11. The method of claim 1, wherein the at least one characteristic comprises a plurality of characteristics, wherein analyzing the image to obtain at least one characteristic of the rendering of the face comprises: analyzing the image to obtain the plurality of characteristics, and wherein forming the model of the rendering of the face or body part comprises: forming the model as a function of the plurality of characteristics.

12. The method of claim 1, wherein the at least one article comprises clothing, jewelry, makeup, lipstick, contour, foundation, eye liner, hair coloring, hair styles, highlights, eyeglasses, or contact lenses.

13. The method of claim 1, further comprising applying to the at least one region within the model a rendering of the at least one article using the at least one computing device.

14. A system, comprising:
a memory operable to store program instructions to:
obtain an image that includes a rendering of a face or body part of a person;
analyze the image to obtain at least one characteristic of the rendering;
form, as a function of the at least one characteristic, a model of the rendering;
process the image to obtain at least one region of the rendering of the face;
include in the model the at least one region;
use the model to select at least one article for the person;
apply to the at least one region a rendering of the at least one article; and
at least one graphical user interface operable to apply, adjust, reduce, minimize, or eliminate the opacity of color highlights on an object; and
a processor operable to obtain from the memory the program instructions, and operable to execute the program instructions.

15. The system of claim 14 wherein the program instructions to use the model to select at least one article for the person comprise: program instructions to apply, to the image, a rendering of the at least one article.

16. The system of claim 15, wherein the program instructions to obtain the image comprise:
at least one of (i) program instructions to obtain the image from a storage medium, and (ii) program instructions to obtain the image from an image capturing device.

17. The system of claim 14, wherein the memory further comprises program instructions to:
form an output image, wherein the output image includes the image having the rendering of the face and the rendering of the at least one article; and
output the output image to a given media so as to allow for re-rendering of the image with the rendering of the face or body part and the rendering of the at least one article.

18. The system of claim 17, wherein the program instructions to use the model to select at least one article for the person comprises program instructions to:
provide, as a function of the model, a plurality of articles for the person; and
select from the plurality of articles the at least one article for the person.

19. The system of claim 14, wherein the memory further comprises program instructions to:
process the image to obtain at least one region of the rendering of the face or body part; and
include in the model the at least one region, wherein the program instructions to use the model to select at least one article comprises program instructions to:
select the at least one region; and
apply to the at least one region a rendering of the at least one article.

20. The system of claim 14, wherein the at least one characteristic comprises a plurality of characteristics, wherein the program instructions to analyze the image to obtain at least one characteristic of the rendering of the face or body part comprise:
program instructions to analyze the image to obtain the plurality of characteristics, and wherein the program instructions to form the model of the rendering comprise:
program instructions to form the model as a function of the plurality of characteristics.

* * * * *